US010108979B2

(12) United States Patent
Shulman et al.

(10) Patent No.: US 10,108,979 B2
(45) Date of Patent: Oct. 23, 2018

(54) ADVERTISEMENT EFFECTIVENESS MEASUREMENTS

(71) Applicant: Google LLC, Mountain View, CA (US)

(72) Inventors: Matthew A. Shulman, Seattle, WA (US); Diane Lambert, Berkeley Heights, NJ (US); Peter Kellis Kamvysselis, Mountain View, CA (US); Ekaterina Rogers, Redmond, WA (US)

(73) Assignee: Google LLC, Mountain View, CA (US)

( * ) Notice: Subject to any disclaimer, the term of this patent is extended or adjusted under 35 U.S.C. 154(b) by 481 days.

(21) Appl. No.: 14/701,070

(22) Filed: Apr. 30, 2015

(65) Prior Publication Data

US 2015/0235261 A1    Aug. 20, 2015

Related U.S. Application Data

(63) Continuation of application No. 12/410,972, filed on Mar. 25, 2009.

(51) Int. Cl.
*G06Q 30/00*  (2012.01)
*G06Q 30/02*  (2012.01)

(52) U.S. Cl.
CPC ................ *G06Q 30/0246* (2013.01)

(58) Field of Classification Search
CPC ........................................... G06Q 30/02

USPC ................ 705/14.73, 14.41, 14.42, 14.45
See application file for complete search history.

(56) References Cited

U.S. PATENT DOCUMENTS

| | | | |
|---|---|---|---|
| 2001/0044835 A1* | 11/2001 | Schober ................ | G06F 8/60 709/217 |
| 2004/0172331 A1* | 9/2004 | Merriman ............ | G06Q 30/02 705/14.66 |
| 2008/0010133 A1 | 1/2008 | Pyhalammi | |
| 2008/0040217 A1 | 2/2008 | Dellovo | |
| 2008/0104496 A1* | 5/2008 | Williams ............. | G06Q 10/107 715/209 |
| 2008/0133342 A1* | 6/2008 | Criou ................... | G06Q 30/02 705/14.41 |
| 2008/0235123 A1 | 9/2008 | Olliphant | |
| 2009/0171754 A1 | 7/2009 | Kane | |
| 2009/0217186 A1 | 8/2009 | Pyhalammi | |
| 2010/0138295 A1 | 6/2010 | Caron | |
| 2010/0138316 A1 | 6/2010 | Connors | |

* cited by examiner

*Primary Examiner* — Sun M Li
(74) *Attorney, Agent, or Firm* — Fish & Richardson P.C.

(57) ABSTRACT

A dashboard to integrate gadgets and present data output from the gadgets in an integrated user interface. The gadgets dynamically collect information about an advertisement or an ad campaign associated with the advertisement as the information is collected from various sources during the ad campaign, each of some of the gadgets processing collected information and outputting the processed information in real time.

18 Claims, 17 Drawing Sheets

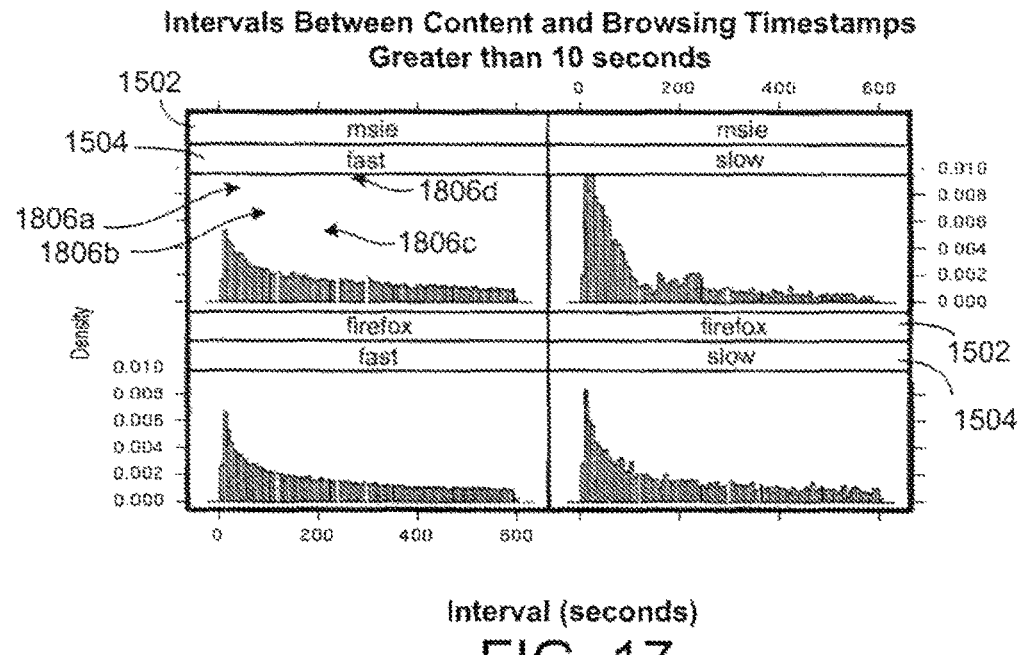

FIG. 17

| Browser type | Internet connection speed | Sequence of times | Threshold (seconds) |
|---|---|---|---|
| Firefox | Fast | First < second | 9.3 |
| Firefox | Slow | First < second | 10.2 |
| Firefox | Unknown | First < second | 10.3 |
| Firefox | Fast | First > second | Unknown |
| Firefox | Slow | First > second | Unknown |
| Firefox | Unknown | First > second | Unknown |
| MSIE | Fast | First < second | Unknown |
| MSIE | Slow | First < second | Unknown |
| MSIE | Unknown | First < second | Unknown |
| MSIE | Fast | First > second | 7.3 |
| MSIE | Slow | First > second | 8.9 |
| MSIE | Unknown | First > second | 7.9 |
| Unknown | Any | First < second | 6.3 (11.5*) |
| Unknown | Any | First > second | 7.7 (9.9*) |

* signifies that the classification is uncertain up to this value

FIG. 18

ADVERTISEMENT EFFECTIVENESS MEASUREMENTS

CROSS-REFERENCE TO RELATED APPLICATIONS

This application is a continuation application of, and claims priority to, U.S. patent application Ser. No. 12/410,972, titled "Advertisement Effectiveness Measurement," filed on Mar. 25, 2009. The disclosure of the foregoing application is incorporated herein by reference in its entirety for all purposes.

TECHNICAL FIELD

This document generally relates to information management.

BACKGROUND

The Internet provides access to a wide variety of content items, e.g., video and audio files, web pages, and news articles. Such access to the content items has enabled opportunities for targeted advertising. For example, content items can be identified to a user by a search engine in response to a query submitted by the user. The query can include one or more search terms, and the search engine can identify and, optionally, rank the content items based on the search terms in the query and present the content items to the user (e.g., according to the rank). The query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's text or image advertisements on web pages that have content related to the advertisement. As the users are likely interested in the particular content on the publisher webpage, they are also likely to be interested in the product or service featured in the advertisement. Accordingly, such targeted advertisement placement can help drive online customers to the advertiser's website.

The serving of the advertisements can be improved by evaluating the effectiveness of the advertisements. One technique for evaluating the effectiveness of an advertisement is to survey an audience for advertisement recognition and brand linkage after an advertising campaign has run. The measure of advertisement recognition can, for example, be based on the percentage of a survey audience that recognizes the advertisement, and the measure of brand linkage can, for example, be based on the percentage of the survey audience that correctly identifies the featured product and/or brand of the advertisement. An advertisement can be brand obfuscated, i.e., branding and/or product information can be removed from the advertisement, and an audience can be surveyed to measure the brand linkage and advertisement recognition. Post-campaign ad effectiveness studies may show, for example, whether online user behavior as manifested by web site visitations and search activity have increased due to the display of ads. The experience gained in one ad campaign may be used in designing future ad campaigns.

SUMMARY

This document describes a system that provides a dashboard to integrate various gadgets and present the data output from the gadgets in an integrated user interface. The gadgets dynamically collect information about one or more advertisements, or one or more ad campaigns associated with the one or more advertisements in real time from various sources during the ad campaigns. Each of some of the gadgets processes the collected information and outputs the processed information in real time to allow an advertiser to evaluate the performance of an advertisement or ad campaign in real time.

In some examples, some of the gadgets may collect information related to the timings of both a content presentation on a web page and a web page access by a user, and uses the collected information to determine if the user accessed the web page while the content was presented on the web page. For example, a user's device (e.g., a web browser on a personal computer or mobile phone) may obtain non-ad content (e.g., the main text of a web page) from one location and advertisements (which can include, e.g., images or text) from another location and displays both of them to the user at the same time. In some examples, a television can obtain advertisements (which can include, e.g., images or videos) to show alongside the main television programs that the viewer is watching. In some examples, a radio can obtain advertisements (which can include, e.g., audio recordings) to play along the main radio programs that the listener is listening to. The ads and the main content can come from different sources, and there may be multiple log files. The gadgets can correlate the records from the logs to determine which ads were shown to the user while the user was accessing certain web pages, watching certain television programs, or listening to certain radio programs.

In general, in another aspect, a plurality of gadgets dynamically collect information about at least one of an advertisement or an ad campaign associated with the advertisement as the information is received from a plurality of sources during the ad campaign, each of some of the gadgets processing collected information and outputting a visual representation of the processed information as the information is received; and a dashboard integrates the gadgets and presents the data output from the gadgets in an integrated user interface.

Implementations may include one or more of the following features. Two or more of the gadgets can provide information on effectiveness of corresponding two or more ad campaigns. The dashboard can show ad creatives of the two or more ad campaigns sorted according to the effectiveness of the ad campaigns. At least one of the gadgets can process private data at a client site and implement a security procedure to prevent unauthorized access to the private data. At least one of the gadgets executing at a client site can process data that is private to a third party, and the gadget can implement a security procedure to prevent unauthorized access to the private third party data. At least one of the gadgets can process data indicating a first time related to when a web page was accessed on a device and a second time related to when an advertisement was displayed on the accessed web page to determine if the device accessed the web site while the advertisement was displayed. At least one of the gadgets can determine on-line behaviors of users whose devices have accessed the web site while the content item was displayed. The information can include at least one of data indicating a performance of the advertisement, statistical data associated with the advertisement, or data indicating recognition of a brand associated with the advertisement. The dashboard can provide information on at least one of brand health, campaign effectiveness, competitive brand tracking, market research, offline ad effectiveness, or mix media recommendation.

At least two gadgets can communicate with each other such that a gadget is updated automatically in response to a change in another gadget. A first gadget can process raw data to generate first ad performance data, a second gadget can process the first ad performance data to generate second ad performance data, and when the first gadget updates the first ad performance data, the first gadget can push the updated first ad performance data to the second gadget to enable the second gadget to update the second ad performance data. The gadgets can include a first gadget that processes data output from a second gadget and a third gadget to generate combined data for output. The first gadget can correlate the output from the second gadget with the output from the third gadget to identify a correlation between the outputs from the second and third gadgets. Each of some of the gadgets can include an interactive user interface to allow a user to perform at least one of selecting information related to different ads, selecting information related to different brands, or selecting statistical information for an ad for different periods of time.

One or more application programming interfaces (APIs) can be provided to enable exchange of data among the gadgets. One or more application programming interfaces can be provided to enable export of data from the gadgets or import of data to the gadgets. At least one of the gadgets can be configurable to enable selective view of a portion of the data output from the gadget. The dashboard can present the output from various gadgets in a web page. The integrated user interface can display at least one of text messages, charts, or graphs. Gadgets can provide information that is not associated with the advertisement or ad campaign. The integrated user interface can provide at least one of calendar, time, search trend, or news information. Application programming interfaces can be provided to enable the gadgets that are associated with the advertisement or ad campaign to communicate with gadgets that are not associated with the advertisement or ad campaign.

In general, in another aspect, at a computer, a plurality of gadgets dynamically collect information about at least one of an advertisement or an ad campaign associated with the advertisement as the information is received from a plurality of sources during the ad campaign; for each of some of the gadgets, the collected information is processed and a visual representation of the processed information is output; a dashboard presents the data output from the gadgets in an integrated user interface; and the data being presented are dynamically updated as the information is received during the ad campaign.

Implementations may include one or more of the following features. Two or more of the gadgets can provide information on effectiveness of corresponding two or more ad campaigns. Ad creatives of the two or more ad campaigns can be shown and sorted according to the effectiveness of the ad campaigns. Cross-gadget communication can be enabled in which a first gadget updates information output from the first gadget and sends a signal to a second gadget to cause the second gadget to update information output from the second gadget. One or more application programming interfaces can be provided to enable exchange of data among the gadgets. One or more application programming interfaces are provided to enable export of data from the gadgets or import of data to the gadgets.

In general, in another aspect, a web interface enables uploading of gadgets to an on-line gadget marketplace and downloading of one or more of the gadgets from the on-line gadget marketplace, each of some of the gadgets configured to dynamically collect and process information about at least one of an advertisement or an ad campaign associated with the advertisement as the information is received during the ad campaign; a set of application programming interfaces enables data to be imported to the gadgets or exported from the gadgets, or to enable cross-gadget communication among the gadgets; and a storage stores the uploaded gadgets.

Implementations may include one or more of the following features. Gadget templates or components can be used to build gadgets. A security module controls access to one or more of the gadgets.

In general, in another aspect, a web interface is provided to enable uploading of gadgets to an on-line gadget marketplace and downloading of the gadgets from the on-line gadget marketplace, each of some of the gadgets configured to dynamically collect information about at least one of an advertisement or an ad campaign associated with the advertisement as the information is received during the ad campaign; uploaded gadgets are stored in a storage; a set of application programming interfaces (APIs) is provided to enable data to be imported to the gadgets or exported from the gadgets; and a set of APIs is provided to enable cross-gadget communication among the gadgets.

In general, in another aspect, an apparatus includes gadgets that dynamically collect information about an advertisement or an ad campaign associated with the advertisement in real time from various sources during the ad campaign, each of at least some of the gadgets processing collected information and outputting the processed information in real time; and means for integrating the gadgets and presenting the data output from the gadgets in an integrated user interface.

In general, in another aspect, data comprising a time point related to when a web page is accessed on a device and another time point related to when a content item is displayed on the accessed web page are obtained; an interval between the two time points is calculated; and a determination is made as to whether the device accessed the web site while the content was displayed on the web site based on a comparison of the interval to at least one predetermined threshold.

Implementations may include one or more of the following features. The device can include a computer or a cell phone. The data can include an internet connection speed of the device and a type of web browser used by the device. The content can include an advertisement. The determining can be based on whether the first time is before or after the second time. The at least one predetermined threshold can be determined by executing instructions on a computer, including calculating, for each of a plurality of devices, an interval between a first time related to when the device accessed a web page and a second time related to when a content was displayed on the accessed web page; calculating for each interval a probability that the interval is a member of one of two groups that are each characterized by different statistics; and determining at least one predetermined threshold that classifies each interval into one of the two groups and reduces misclassifications. In some examples, the at least one predetermined threshold includes an upper threshold and a lower threshold. If the interval is less than the lower threshold, then there is a match. If the interval is above the upper threshold, then there is no match. If the interval is between the lower threshold and the upper threshold, then there is a high likelihood of misclassification, so the match is classified as uncertain and the interval is not used. The lower threshold is chosen to reduce the probability of identifying a match when there is no match. The upper threshold is chosen to reduce the probability of identifying a non-match when there really is a match. On-line behaviors of users whose devices have accessed the web site while the content item was displayed can be determined. A report of the on-line behaviors can be generated. On-line behaviors of users whose devices have not accessed the web site while the content item was displayed can be determined. A report of the on-line behaviors can be generated.

In general, in another aspect, for each of a plurality of devices, data comprising a first time related to when a device accessed a web page and a second time related to when a content item was displayed on the accessed web page are obtained; an interval between the first time and the second time associated with each of the plurality of devices is calculated; and a range of intervals for which the device is more likely than not to have accessed the web page while the content was displayed on the web page is determined.

Implementations may include one or more of the following features. The plurality of devices can include at least one of computers or cell phones. The data can include an internet connection speed of some of the plurality of devices and a type of web browser used by a group of the plurality devices. The content item can include an advertisement. The range of intervals can be relative to a measurement of a first time related to when a web page is accessed on a device. The range of intervals can be determined by calculating for each interval a probability that the interval is a member of one of two groups that are each characterized by different statistics; and a threshold that classifies each interval into one of the two groups and reduces misclassifications can be determined, in which values below the threshold are within the range of intervals. One group can be characterized by statistics of a uniform distribution, a lognormal distribution, or a gamma distribution.

In general, in another aspect, a collector obtains data including a first time related to when a web page is accessed on a device and a second time related to when a content item is displayed on the accessed web page; and an analyzer calculates an interval between the first time and the second time, and determines if the device accessed the web site while the content was displayed on the web site based on a comparison of the interval to a predetermined threshold.

Implementations may include one or more of the following features. The device can include a computer or a cell phone. The data can include an internet connection speed of the device and a type of web browser used by the device. The content item can include an advertisement. The analyzer can determine if the device accessed the web site while the content was displayed on the web site also based on whether the first time is before or after the second time. A server provides a plurality of gadgets and a dashboard, at least one of the gadgets receiving and processing data from the analyzer and outputting a visual representation of the processed data as the data is received from the analyzer, the dashboard presenting the data output from the plurality of gadgets in an integrated user interface at a client machine. At least one of the gadgets processes private data at the client machine and implements a security procedure to prevent unauthorized access to the private data.

In general, in another aspect, a collector obtains, for each of a plurality of devices, data including a first time related to when a device accessed a web page and a second time related to when a content item was displayed on the accessed web page; and an analyzer calculates an interval between the first time and the second time associated with each of the plurality of devices, and determines a range of intervals for which the device is presumed to have accessed the web page while the content was displayed on the web page.

Implementations may include one or more of the following features. The plurality of devices can include at least one of computers or cell phones. The data can include an Internet connection speed of some of the plurality of devices and a type of web browser used by a group of the plurality devices. The content can include an advertisement. The range of intervals can be relative to a new measurement of the first time. The analyzer can determine the range of intervals by calculating for each interval a probability that the interval is a member of one of two groups that are each characterized by different statistics; and determining a threshold that classifies each interval into one of the two groups and reduces misclassifications, in which values below the threshold are within the range of intervals. One group can be characterized by statistics of a uniform distribution, a lognormal distribution, or a gamma distribution.

These and other aspects and features, and combinations of them, may be expressed as methods, apparatus, systems, means for performing functions, program products, and in other ways.

Advantages of the aspects and features include none, one, or more of the following. Advertisers can more easily access data that are useful for evaluating performance of ads. Useful data from various sources can be gathered and presented to advertisers in integrated user interfaces. The dashboards can be easily customized to satisfy the needs of the advertisers. More ad revenue can be generated for advertisers and publishers by understanding how users' behaviors may change after viewing a content item (e.g., an ad). Ad campaigns can be analyzed and improved for effectiveness or efficiency.

The details of one or more implementations are set forth in the accompanying drawings and the description below. Other features and advantages will be apparent from the description and drawings, and from the claims.

DESCRIPTION OF DRAWINGS

FIGS. 14-17 are example histograms of distances (i.e., delays) between events.

FIG. 18 is a table that includes example browser types, internet connection speeds, sequences of times, and thresholds.

DETAILED DESCRIPTION

System Overview

Figure 1:
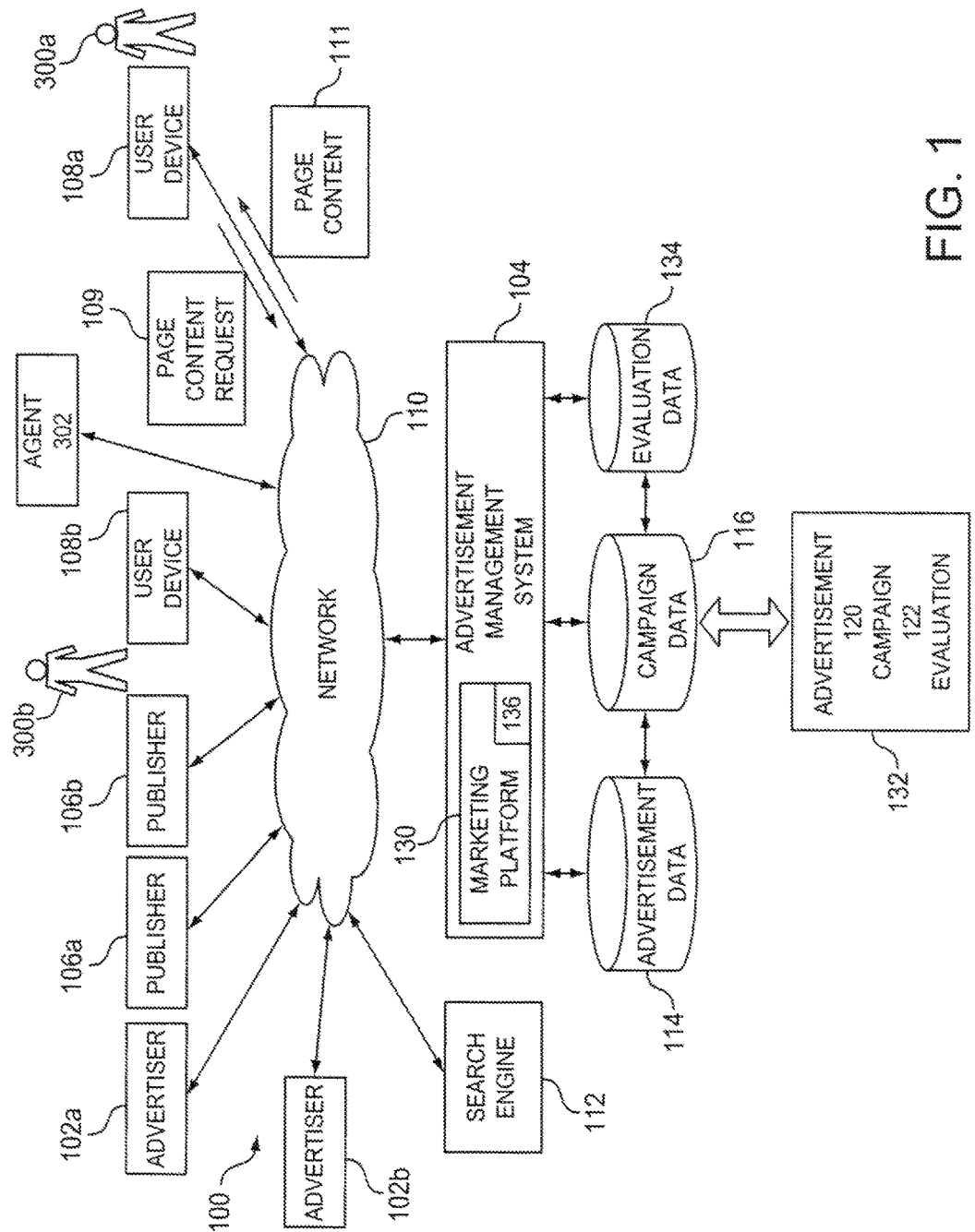
FIG. 1 is a block diagram of an example online environment.

FIG. 1 is a block diagram of an example online environment 100. The online environment 100 can facilitate the identification and serving of content items, e.g., web pages or advertisements (ads), to users. Advertisers (e.g., 102a and 102b, collectively referenced as 102), publishers (e.g., 106a and 106b, collectively referenced as 106), end users (e.g., 300a and 300b, collectively referenced as 300) can access a search engine 112 and an advertisement management system 104 through a network 110. The advertisement management system 104 provides customizable dashboards that integrate various gadgets and present the data output from the gadgets in an integrated user interface to enable the advertisers 102 or other users of the system 104 to easily visualize information collected from many sources to evaluate effectiveness of advertisements 120 and ad campaigns 122 in real time throughout the duration of the ad campaigns 122.

In FIG. 1, although only two advertisers (102a and 102b), two publishers (106a and 106b) and two end users (300a and 300b) are shown, the online environment 100 may include many more advertisers, publishers and end users. The term "end user" refers to a consumer of content and ads provided by the publishers and advertisers. The advertiser 102 can refer to an entity (e.g., an individual or company) whose products or services are being advertised, or an entity that sponsors an advertisement 120. In some examples, an agent 302 can produce ads on behalf of the advertisers 102. The term "user," as used in "user of the system 104," may broadly refer to any entity that uses the system 104, including advertisers 102 and agents 302. The network 110 can be, e.g., a local area network (LAN), a wide area network (WAN), the Internet, or a combination thereof.

In some implementations, the advertiser 102 can directly or indirectly, enter, maintain, and track advertisement information in the advertising management system 104. The advertisements can be in the form of graphical advertisements, such as banner advertisements, text only advertisements, image advertisements, audio advertisements, video advertisements, or advertisements combining one of more of such components, or any other type of electronic advertisement document 120. The advertisements may also include embedded information, such as links, meta-information, and/or machine executable instructions, such as HTML or JavaScript™.

End users 300 can use end user devices (e.g., 108a or 108b, collectively referenced as 108) to submit page content requests 109 to publishers 106 or the search engine 112. In some implementations, page content 111 can be provided to the end user device 108 in response to the request 109. The page content can include advertisements provided by the advertisement management system 104, or can include executable instructions, e.g., JavaScript™ instructions, that can be executed at the end user device 108 to request advertisements from the advertisement management system 104. Examples of the end user devices 108 include personal computers, mobile communication devices, and television set-top boxes.

The advertisements can be provided from the publishers 106. For example, the publisher 106 can submit advertisement requests for advertisements to the system 104. The system 104 responds by sending the advertisements to the requesting publisher 106 for placement on one or more of the publisher's web properties (e.g., websites and other network-distributed content). The advertisements can include embedded links to landing pages, e.g., pages on the advertiser's websites, that an end user is directed to when the end user clicks an ad presented on a publisher website. The advertisement requests can also include content request information. This information can include the content itself (e.g., page or other content document), a category corresponding to the content or the content request (e.g., arts, business, computers, arts-movies, and arts-music), part or all of the content request, content age, content type (e.g., text, graphics, video, audio, and mixed media), and geo-location information.

In some implementations, a publisher 106 can combine the requested content with one or more of the advertisements provided by the system 104. The combined page content request 109 and advertisements can be sent to the end user device 108 that requested the content as page content 111 for presentation in a viewer application (e.g., a web browser or other content display system). The publisher 106 can transmit information about the advertisements back to the advertisement management system 104, including information describing how, when, and/or where the advertisements are to be rendered (e.g., in HTML or JavaScript™).

The publishers 106 can use general content servers that receive requests for content (e.g., articles, discussion threads, music, video, graphics, search results, web page listings, and information feeds), and retrieve the requested content in response to the request. For example, content servers related to news content providers, retailers, independent blogs, social network sites, or any other entity that provides content over the network 110 can be used by the publisher 106.

In this document, the term publisher, advertiser, and agent, depending on context, can either refer to the human publisher, advertiser, and agent, or computers operated by the publisher, advertiser, and agent, respectively.

The advertisements can be provided through the search engine 112. The search engine 112 can receive queries for information, and in response, the search engine 112 can retrieve relevant search results from an index of documents (e.g., web pages). Search results can include, for example, lists of web page titles, snippets of text extracted from the web pages, and hypertext links to the web pages, and may be grouped into a predetermined number of search results.

The search engine 112 can submit a request for advertisements to the system 104. The request may include a number of advertisements desired. This number may depend on the search results, the amount of screen or page space occupied by the search results, and the size and shape of space reserved for the advertisements. The request for advertisements may also include the query (as entered, parsed, or expanded), information based on the query (such as geo-location information, whether the query came from an affiliate and an identifier of such an affiliate), and/or information associated with, or based on, the search results. Such information may include, for example, identifiers related to the search results (e.g., document identifiers), scores related to the search results (e.g., information retrieval (IR) scores), snippets of text extracted from identified documents (e.g., web pages), full text of identified documents, and feature vectors of identified documents. In some implementations, IR scores can be computed from, for example, dot products of feature vectors corresponding to a query and a document, page rank scores, and/or combinations of IR scores and page rank scores.

The search engine 112 can combine the search results with one or more of the advertisements provided by the system 104. The combined information can be forwarded to the end user device 108 that requested the content as the page content 111. The search results can be maintained as distinct from the advertisements, so as not to confuse the end user 300 between paid advertisements and search results.

The advertisers 102, end user devices 108, and/or the search engine 112 can also provide usage information to the advertisement management system 104. This usage information can include measured or observed end user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate (CTR), and conversion rate.

A click-through can occur, for example, when an end user selects or clicks on a link to a content item returned by the publisher or the advertising management system. The CTR is a performance metric that is obtained by dividing the number of end users that clicked on the content item, e.g., a link to a landing page, an advertisement, or a search result, by the number of times the content item was delivered. For example, if a link to a content item is delivered 100 times, and three persons clicked on the content item, then the CTR for that content item is 3%. Other usage information and/or performance metrics can also be used.

A "conversion" occurs when an end user consummates a transaction related to a previously served advertisement. What constitutes a conversion may vary from case to case and can be determined in a variety of ways. For example, a conversion may occur when an end user clicks on an advertisement, is referred to the advertiser's web page, and consummates a purchase there before leaving the web page. A conversion can also be defined by an advertiser to be any measurable or observable end user action such as, for example, downloading a white paper, navigating to at least a given depth of a website, viewing at least a certain number of web pages, spending at least a predetermined amount of time on a website or web page, or registering on a website. Other actions that constitute a conversion can also be used.

The advertisements, associated usage data, and other related parameters can be stored as advertisement data in an advertisement data store 114. The advertiser 102 can further manage the serving of advertisements by specifying an advertising campaign. The advertising campaign can be associated with campaign data stored in a campaign data store 116, which can, for example, specify advertising budgets for advertisements, when, where and under what conditions particular advertisements may be served for presentation. For example, a computer company may design an advertising campaign for a new laptop computer that is scheduled to be released on November 20. The advertising campaign may have a budget of $500,000, and may have 30 different advertisements that are to be served for presentation during the month of November. Such data defining the advertisement campaign can be stored in the campaign data 116.

The advertisement management system 104 includes a marketing platform 130 that enables the advertiser or other users of the system 104 to measure and review effectiveness of an advertisement 120 and a campaign 122 for the advertisement 120. The marketing platform can be network based and be shared by authorized users to obtain information about the effectiveness of the ad and ad campaign before, during, or after the completion of the campaign. For example, the authorized users can share and exchange information about effectiveness of the ad 120 and campaign 122 dynamically during the campaign 122 to enable the users to adjust the campaign 122 or ad 120 to improve the effectiveness based on the measured results.

The marketing platform 130 can include a multi-layer structure in which one or more lower layers collect, exchange, and/or analyze data associated with the ad and ad campaign, and one or more higher layers present visualized results to the users of the platform 130. The lower layers may include for example, evaluation tool 132 that obtains online and offline data that are associated with the effectiveness of the ad 120 and the campaign 122 and can be stored in evaluation data 134. The higher layers may include for example, a dashboard 136 that presents the results of the effectiveness measurement in real time to the users through a user interface. For example, the results of the effectiveness measurement can be presented through the dashboard 136 while the ad campaign is on-going. The effectiveness measurement data can be presented shortly after raw data used to determine the ad effectiveness is collected and processed. It is not necessary to wait until the end of the ad campaign to obtain the results. In some implementations, the dashboard 130 can be a webpage accessible through a network, e.g., the Internet, by the authorized users using a network address, e.g., an IP address of the webpage.

Marketing Platform and Dashboards

Figure 2A:
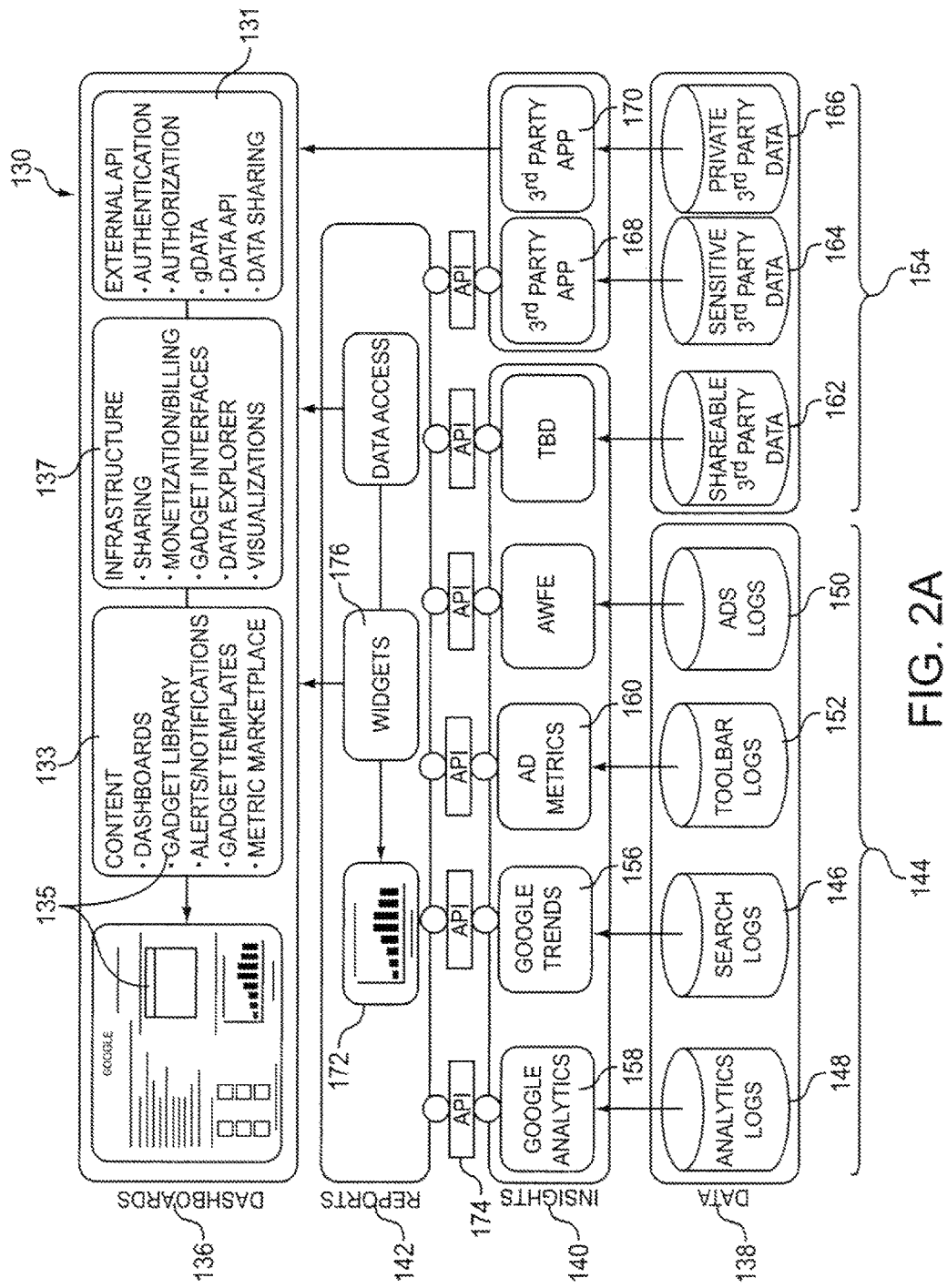
FIG. 2A is a block diagram of an example marketing platform.

Referring to FIG. 2A, in some implementations, the marketing platform 130 includes a four-layer structure. The top layer includes the dashboard 136 that interfaces with the users (e.g., advertisers 102 or agents 302) through external application programming interfaces (API) 131. The dashboard 136 presents its content 133, which may include information collected by gadgets 135, to the users in a visualized format. The top layer is supported by an infrastructure 137 that processes data from the other layers and presents the data through, e.g., a graphical user interface.

The three supporting layers include a first layer 138 that obtains raw data associated with the effectiveness of the ad or ad campaign being evaluated. For example, the first layer 138 may include logs 144 that contain raw data (e.g., unedited data) from search logs 146 having information about searches, analytics logs 148 having data gathered by analytical tools, ads logs 150 having information about which ads were served, toolbar logs 152 having information about statistics gathered by toolbars, and other sources.

The first layer 138 also includes third party databases 154 that contain data indirectly related to the ad or ad campaign. For example, the raw data in the third party databases 154 include shareable third party data 162, sensitive third party data 164, private third party data 166, and other proprietary data such as retail data, marketing spend across vendors and media, proprietary cubes, and proprietary logs.

For example, the shareable third party data 162 can include public information related to a third party, or data that the third party is willing to share with others, either freely or through license agreements. Some companies that use the advertisement management system 104 may not mind sharing certain information, such the ad creatives that were used and the amount of impressions received.

The sensitive third party data 164 can include confidential information about a third party that the third party allows the advertisement management system 104 to access, but the data is confidential and should not be shared with others. For example, the ad management system 104 may provide an infrastructure that allows the third party to convenient store and manage the sensitive data. The system 104 may provide tools that process the sensitive data to generate various reports useful to the third party. The gadgets 135

The private third party data 166 can include confidential information of the user of the advertisement management system 104 (here, the "third party" refers to the user of the system 104).

The first layer 138 can include a data security mechanism to allow authorized access to confidential data and prevent unauthorized access to the confidential data. Some of the raw data may include personal information. For example, the first layer 138 can also have privacy preserved through obfuscation of individually identifying information or other personal information, through the introduction of noise into the raw data, or through other privacy protecting mechanisms.

In addition to online data, the first layer 138 of the marketing platform 130 can also include offline data. The offline databases can include data associated with, for example, TV campaigns or radio campaigns launched, for example, with the operator of the advertisement management system 104.

A second layer 140 analyzes the raw data from the first layer 138 and provides insights, e.g., trends, to the data. For example, the second layer 140 may include products that interact with the first layer 138 and create specialized databases and front ends based on the raw data. Examples of the products include a search trends tool 156 that offers insights into the search data 146, an analytics tool 158 that provides information to the analytics logs 148, and an ad metrics tool 160 that combines the toolbar logs 152 with ads logs 150 to measure effectiveness of online advertising. The products may also include third party applications 168 to analyze the raw, third party data.

A third layer 142 generates reports 172 on the effectiveness of the ad 120 and campaign 122 based on the analyzed data and insights provided by the second layer 140. APIs 174 interface the second and third layers to allow widgets 176 contained in the third layer 142 to access the analyzed data and insights from the second layer 140. The third layer 142 combines and organizes analyzed data from different sources to produce the reports 172 to be presented to the users. The reports 172 allows the effectiveness of the ad and ad campaign to be easily visualized and evaluated. For example, the reports 172 can be charts, text, diagrams, graph curves, or other formats.

Figure 2B:
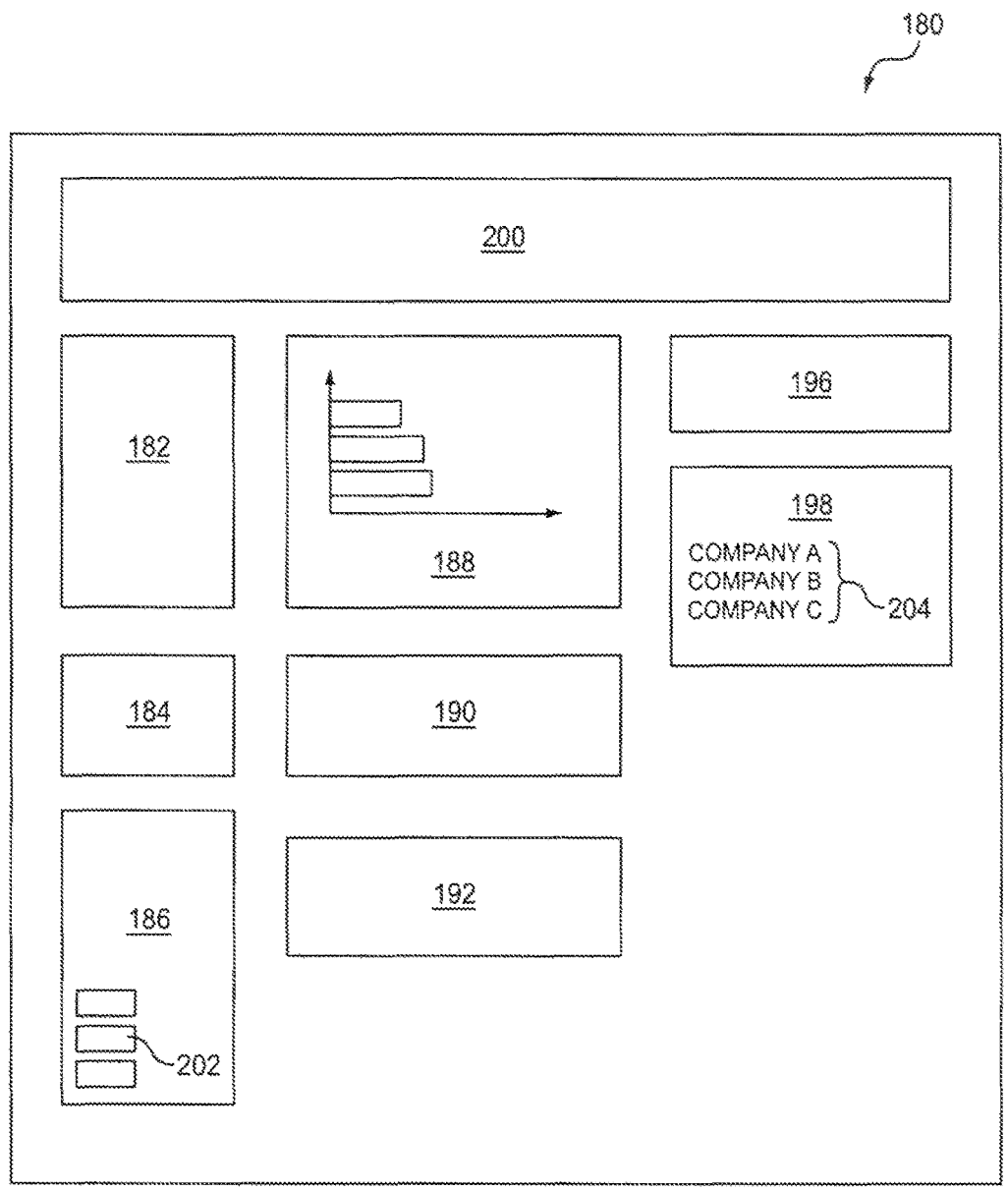
FIG. 2B is a screen shot of an example dashboard.

In some implementations, the top layer containing the dashboard 136 presents one or more reports 172 generated in the third layer 142 in one or more web pages shown to the user. In FIG. 2B, a dashboard 180 in the form of an online webpage contains one or more gadgets 182, 184, . . . , 200, each providing visualization of the reports 172 of FIG. 2A.

For example, gadgets can be HTML or JavaScript applications that can be embedded in web pages or other applications. For example, the gadgets can process data into a visualized format. For example, the gadgets can enable data sharing through the web pages or other applications.

In the example shown in FIG. 2B, the gadget 182 shows a report on correlation between marketing spend and the effectiveness of the ad and ad campaign, which is generated based on, e.g., a combination of the effectiveness data from databases 144 and the private third party data 166. The gadgets 184, 186, 192, 194 present a calendar, custom skins 202, a reading list, and news, respectively, each presenting information based on the shareable third party data 162. The gadget 188 and 196 contain reports on performance against goal and trend, respectively. The reports are generated based on the data in the databases 144. The gadget 198 contains information about competing companies 204, which can be generated based on the sensitive third party data 164. In some examples, a gadget can be configured to enable a user to selectively view a portion of the data output from the gadget. The user can select the criteria for which relevant data is displayed. Such criteria can include, for example, a time period or a particular third party. For example, the gadget 188 or 196 can show performance against goal and trend within a user selected period of time, instead of all data output from the gadget.

The gadgets (e.g., 182, 184, etc.) each updates the information presented in real time manually or automatically. For example, the first layer 138 and second layer 140 of FIG. 2A can be configured to automatically update the databases 144 and 154 (e.g., at a pre-selected time interval), and analyze the updated raw data in the databases. The gadgets of the third layer 142 and the top layer exchange data with the second layer 140 through the API 174, e.g., by importing data from or exporting data to the second layer 140 to generate the reports 172 and visually present the reports to the user in real time using the updated data. In some implementations, the user can manually update the information provided by the gadgets by, for example, refreshing the dashboard 180 or reopening the dashboard 180.

In some implementations, the gadgets (e.g., 182, 184, 186, etc.) may communicate with each other through the API 174 so that when the information in one gadget changes, other gadgets that contain or use this information are updated. For example, if the database 144 obtains new raw data regarding the performance of the ad 120, the gadget 196 obtains the analyzed new raw data through the API 174 and presents an updated trend. At the same time, the gadget 188 updates the visual graph for performance against goal. As another example, a gadget containing campaign details can be included in the dashboard 180 such that when parameters of the campaign are updated, the updated parameters can be automatically populated to the other gadgets (e.g., gadget 188) that are using the parameters. Other types of communications are also possible.

In addition to presenting visualized real-time effectiveness data to the user, the dashboard 136 also provides a platform for exchanging data (e.g., raw data from databases 144 and 154 of FIG. 2A) and results of analyses (e.g., analyzed data from the insight layer 140) between the information requesters (e.g., the users of the dashboard 136) and the information providers (those who provide the online or offline raw or analyzed data). Such an information exchange platform can facilitate monetization of the exchange of information. For example, the information provider can charge the use of the raw data or analyzed data each time the gadgets of the dashboard 136 import the data.

The information exchange platform can also facilitate communication between the information requesters and providers, and help the requesters and the providers find each other and collaborate on projects. For example, when creating the dashboard 136 and selecting the gadgets, the information requesters become exposed to multiple information providers and can choose the ones that provide information of interest to them. The information providers can also market themselves more effectively through the platform.

The dashboard 136 can be created by, e.g., the advertisers 102 or the agents 302 in FIG. 1. In some implementations, when an advertiser 102 requests an agent 302 to prepare an advertisement to be published by the publishers 106, in addition to the requested ad, the agent 302 also creates a dashboard 136 online for the ad 120 and the associated ad campaign 122. The agent 302 can deliver a link to the dashboard 136 to the advertiser 102 so that the advertiser 102 can access the data regarding the effectiveness of the ad 210 and the campaign 122 prior to the end of the campaign.

In some implementations, the advertisement management system 104 executes code that implements the dashboards, and advertisers 102 access the dashboards using, e.g., web browsers through the links provided by the agents 302. The outputs of the dashboards can be provided as interactive web pages shown on the computers of the advertisers 102. The advertiser 102 and the agent 302 can exchange or share live, real-time information about the effectiveness through the dashboard 136. It is not necessary to wait for the completion of the campaign in order to gather and analyze relevant data. The real-time information can also enable the agent 302 and the advertiser 102 to adjust the strategy of the campaign and modify the ad or ad campaign to improve the effectiveness of the ad prior to the end of the campaign.

In some implementations, the gadgets may have client-side code that allows the gadget to access private data (e.g., ad revenue data) residing on the computers of the advertisers 102. The advertiser 102 may not wish to share such data with the operator of the advertisement management system 104, and thus does not upload such data to the advertisement management system 104. The gadget may have security measures to prevent unauthorized access to the private data. For example, the gadget may request a user name and a password from the advertiser 102.

In some implementations, various gadgets may communicate with one another and exchange private data of the advertiser 102. Each gadget may request the advertiser 102 to provide a user name and password, and only gadgets with proper credentials may receive the private data. Alternatively, the dashboard may request the advertiser 102 to enter a user name and password, and gadgets that are designated secure gadgets by the advertiser 102 may receive private data. The dashboard may provide a user interface to allow the advertiser 102 to modify the list of gadgets that can receive private data. Different gadgets may have different security levels and have different access levels with respect to different types of private data. In some implementations, the gadgets may combine data provided by the advertisement management system 104 with private data of an advertiser 102 to generate useful information.

Users accessing the dashboard 136 online can be authenticated to prevent unauthorized access of the dashboard 136. For example, the authentication process can include requesting the users to enter a user name and a user password. In some implementations, the creator of the dashboard 136, e.g., the advertiser 102, sets up the security information for the dashboard 136. For example, the agent 302 may authorize selected users (e.g., advertisers 102 who are clients of the agent 302) to access the dashboard 136, set up authentication information for the selected users, and deliver the authentication information to the selected users to enable the selected users to access the dashboard 136.

Depending on the application and information required by the advertiser 102, the dashboard 136 can include various combinations of gadgets to provide the required information, e.g., metrics that are useful to the advertiser 102. When the user (e.g., advertiser 102 or agent 302) creates a customized dashboard that includes gadgets, the user can create his own gadgets, use gadgets provided by the operator of the advertisement management system 104, or gadgets acquired from a gadget pool.

The gadget pool refers to a group of gadgets that accessible to users. Some of the gadgets in the gadget pool may be free, some may be available for purchase. A web portal may be provided to allow users to access the gadget pool, view descriptions of the gadgets, and optionally download demo versions of the gadgets.

The dashboard 136 described above can be created online using predefined skins, or created offline using a template and uploaded online for later use. Skins allow a user or developer to control the appearance of the dashboard, by supplying a set of formatting instructions and graphical elements that can be used to supplement or replace default elements used to format the dashboard when a skin is not applied. Skins may affect, e.g., font styles and sizes, colors, borders, backgrounds, images, and other design elements of the dashboard. A creator of the dashboard 136 can access the skins or the template through a user interface, e.g., a computer screen, and add and arrange gadgets on the skins or the template. Skins can also be used to control the appearances of gadgets, for example, to cause the gadgets within a dashboard to have a similar theme or style.

Figure 3:
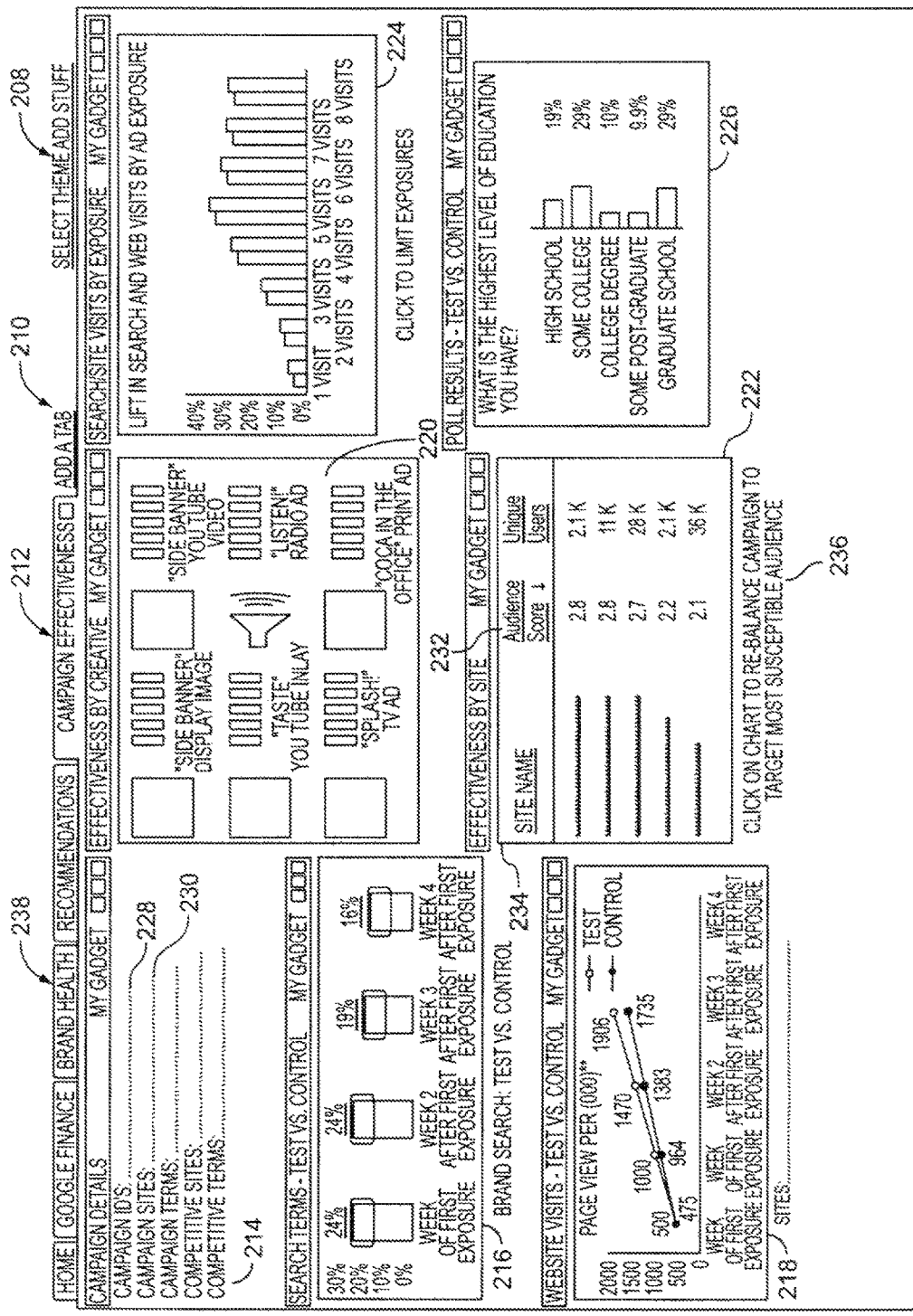
FIGS. 3-6 are screen shots of example dashboards or portions of dashboards.

FIG. 3 shows an example user interface for generating a dashboard 208. For example, the dashboard 208 can be generated online using predefined skins provided by the operator of the system 104. The skins each supply a set of formatting instructions and graphical elements that define the look and feel of the gadgets. The creator of the dashboard 208 can design the graphical appearance of the gadgets. The dashboard 208 can also be created using other online templates.

In some implementations, the dashboard 208 can include one or more pages each having one or more gadgets. One page is shown at a time, and the pages not shown can be accessed through tabs (e.g., 212). Additional pages can be added by clicking on the "add a tab" button 210. Gadgets can be added to any of the pages. In the example shown in FIG. 3, gadgets 214, 216, . . . , 226, etc., are added to the page that corresponds to the "Campaign Effectiveness" tab 212. The user can arrange the positions of the gadgets in the dashboard. Each of the gadgets can provide information about effectiveness of the ad and the ad campaign using graphics or text. For example, the gadget 214 presents campaign information, such as campaign IDs 228 and campaign sites 230. Various effectiveness information is presented by the gadgets 216-226 including, for example, effectiveness by site measured by audience score 232. Some gadgets can also provide additional information to help design and control the campaign. The additional information can include, for example, education levels of the audience of the campaign, as shown in gadget 226, or the number of unique users 234 for particular sites, as shown by the gadget 222. Some of the additional information can be collected by polls or surveys provided online in association with the ad.

Other gadgets can also be used in the dashboard 208, a gadget that shows a calendar, a gadget that shows search trends, gadgets that show news reports, as well as the gadgets shown in FIG. 2B. The gadgets in the dashboard 208 can be arranged in one or more pages. For example, when the gadgets cannot fit within one page, the user can add an additional page using the button 210.

Figure 4:
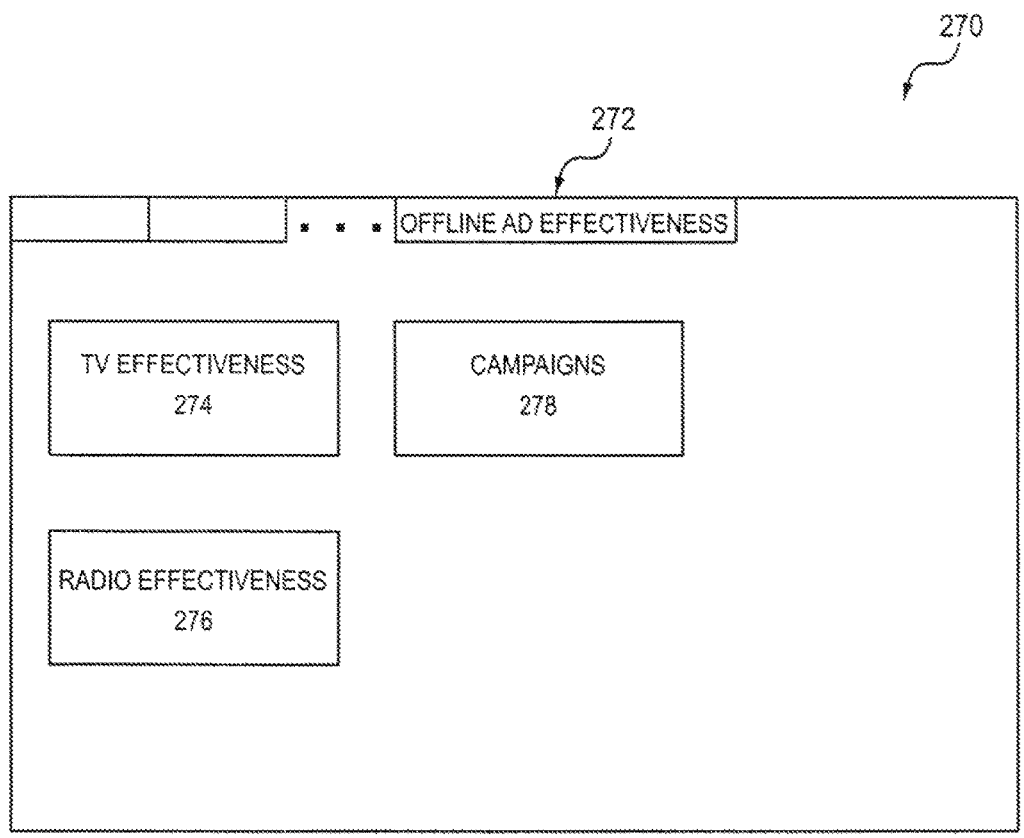

Offline information can be valuable to the measurement of effectiveness of the ad and ad campaign. Referring to FIG. 4, for example, a "TV Effectiveness" gadget 274 pulls real time, second-by-second effectiveness data from set-top boxes by channel or by commercial. A "Radio Effectiveness" gadget 276 displays relevant search data alongside campaign activity as a measure of effectiveness. For example, relevant data can be obtained by surveying listeners of radio programs. In addition, the "Campaigns" gadget 278 displays information obtained across TV and Radio, for example, the expense of each campaign along with a measure of effectiveness derived from the TV effectiveness gadget 274 and the radio effectiveness gadget 276.

Figure 5:
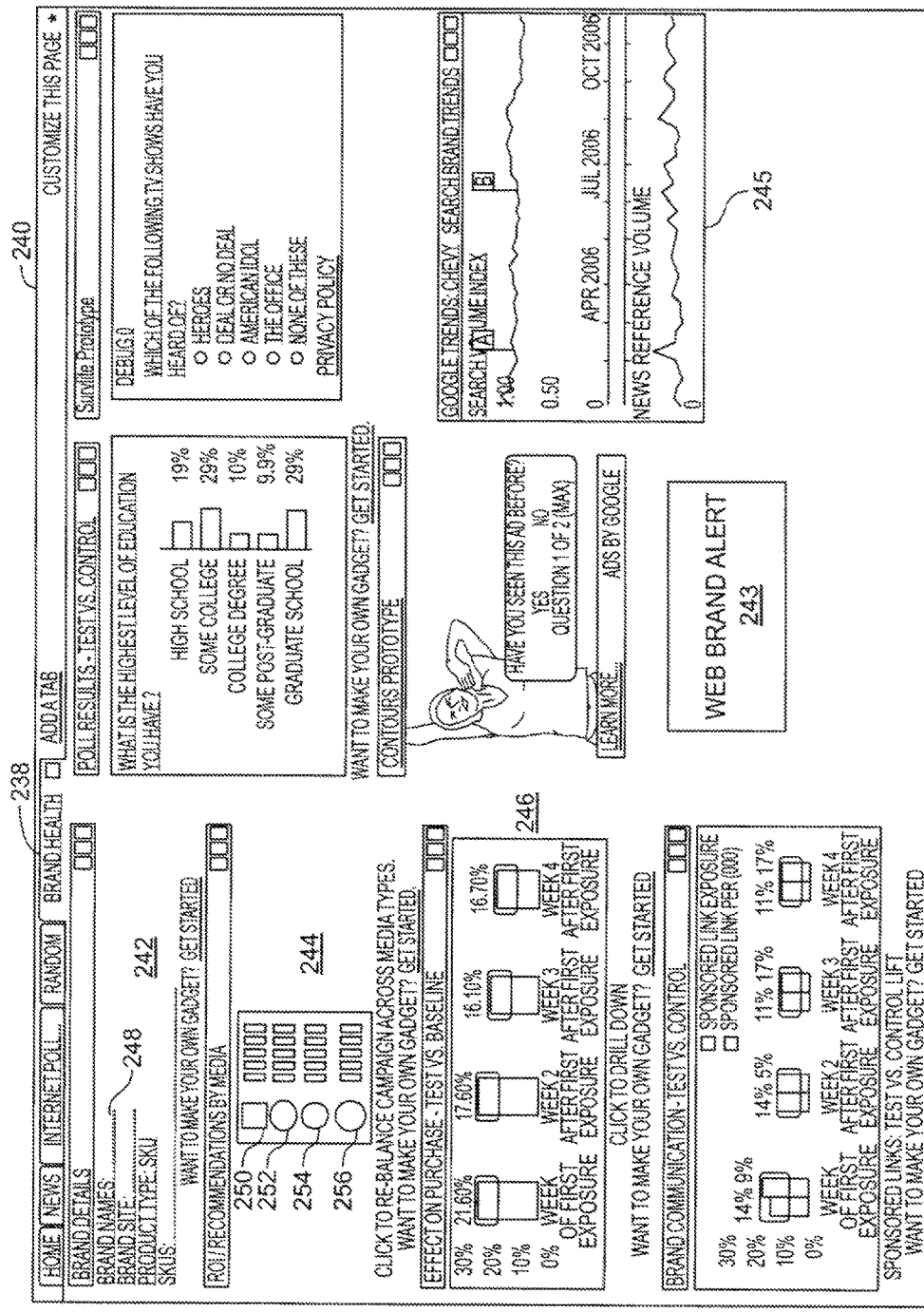

Referring to FIG. 5, as an example, a page 240 of the dashboard under a "brand health" tab 238 can include gadgets presenting both online and off-line information. For example, the gadgets 244 and 246 present off-line information from media, e.g., TV, radio, or printed publication. In the page 240, a gadget 242 provides information about the brands of interest, such as brand names 248, brand sites, product types, SKUs, etc. A gadget 244 presents information about the effectiveness of recommendation from various media, such as Internet 250, TV 252, radio 254, and magazine 256. The information can be collected by polls, organized and provided by other providers, and accessible using, for example, the online searching conducted by the first layer 138 (FIG. 2A). Another gadget 246 provides a chart that shows effects on user purchase behavior during the ad campaign. Information about the purchase can be obtained from, e.g., retailers.

A "web brand alert" gadget 243 and a "search brand trend" gadget 245 can provide online effectiveness measurement information. For example, the "web brand alert" gadget 243 presents the amount of negative comments versus positive comments on the brand (or ads or products associated with the brand), obtained from various web pages. The "search brand trends" gadget 245 automatically shows the search volumes for one particular product of the brand, e.g., the positive versus negative comments on the product.

Figure 6:
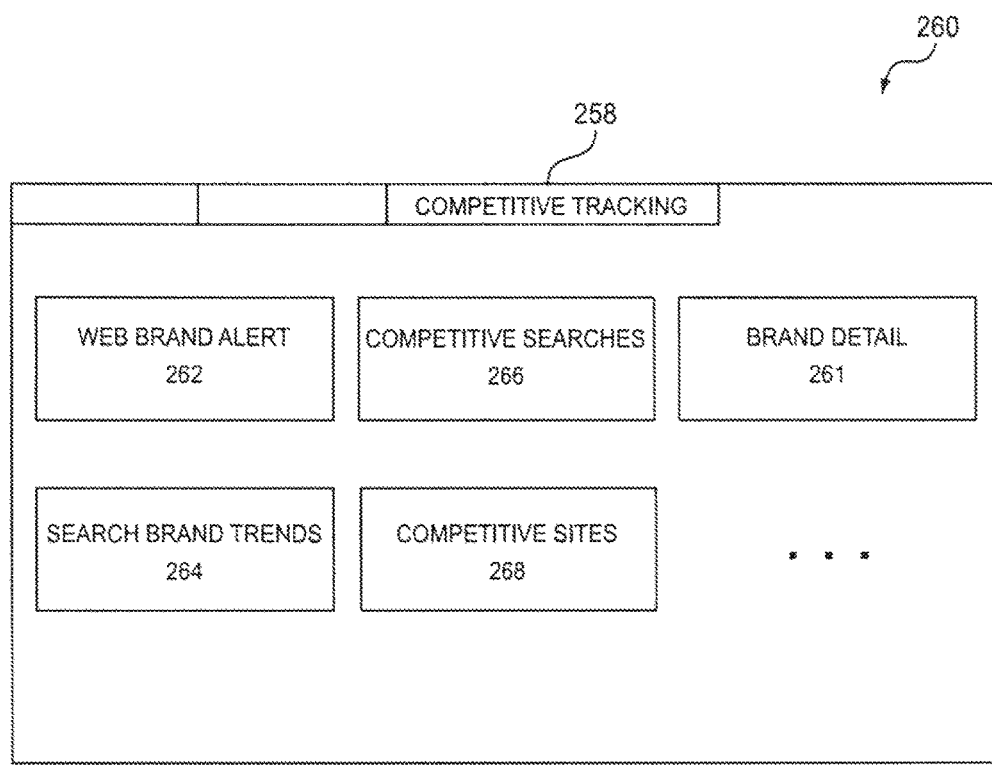

Additional pages can be added to the dashboard 208 to provide the user with additional information regarding the effectiveness of the ad and the campaign. For example, referring to FIG. 6, a "competitive tracking" page 260 can be added that allows the user to track its own brand as well as other competing brands. The "competitive tracking" page 260 can include a "brand detail" gadget 261 in which a user can enter its own brand and its competitors' brands to be tracked. The details of the brands from the gadget 261 are populated to other gadgets on the page 260 so that the other gadgets automatically collects information related to the brands. The page 260 can include brand health information to allow comparison with the competitors' brands. For example, a "web brand alert gadget" 262 automatically subscribes to all posts posted online that are related to the advertiser's brand. The second layer 140 of the marketing platform of FIG. 2A analyzes data from the posts to enable the gadget 262 to present alert information, for example, percentage of negative comments versus positive comments from all subscribed posts. The page 260 can include a "search brand trends" gadget 264 that automatically shows percentage of negative comments versus positive comments from the posts, about one particular model of the advertiser's brand.

Information bout the competitors' brands can be obtained from a "competitive searches" gadget 266 and a "competitive sites gadget" 268 on the page 260. For example, the competitive-searches gadget 266 shows the difference in the number of queries for competitive search terms between test and control groups as a result of exposure to the ads of the advertiser's brand; and the competitive sites gadget 268 shows the difference in the number of website visits between the test and control groups as a result of exposure to the ads of the advertiser's brand.

The page 260 can include other gadgets not shown in the figure, for example, a brand recall gadget or a brand affinity gadget that shows survey results for people who visit competitive sites versus those who visit sites of the advertiser's brand. The information obtained from the various gadgets discussed above can also be used in marketing research.

The effectiveness measurement of an ad and ad campaign using the dashboard described above substantially relies on the functions of the gadgets included in the dashboard. To serve particular goals of the dashboard and the effectiveness measurement, a user may have to create its own gadget.

Gadget Marketplace

Figure 7:
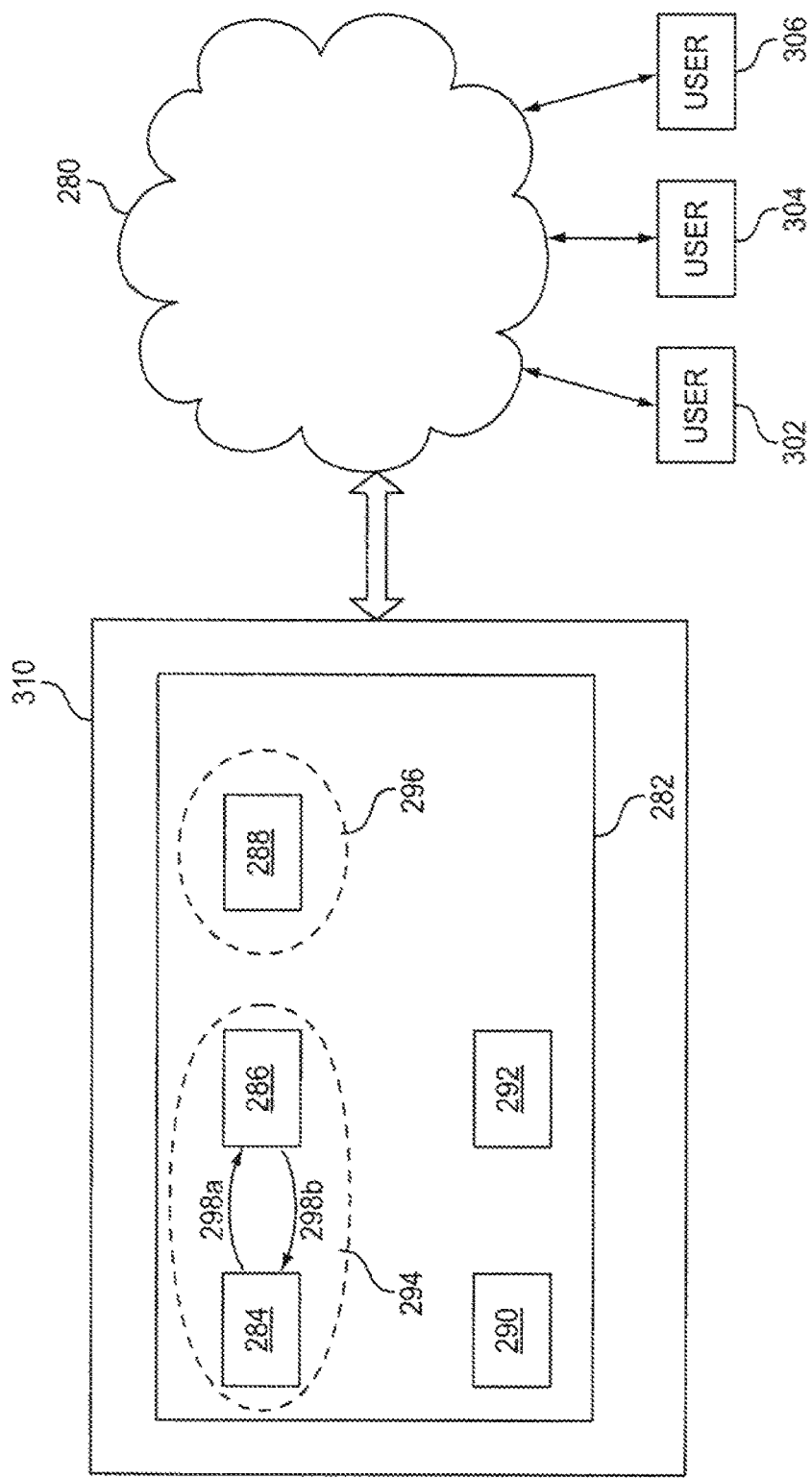
FIG. 7 is a block diagram of an example gadget pool.

Referring to FIG. 7, in some implementations, a gadget marketplace can be implemented by providing a storage 310 to allow users (e.g., 312, 314, 316) to upload gadgets (e.g., 284, 286, and 288) through a network 280 to form an online gadget pool 282. The storage 310 can be, e.g., one or more hard disk drives in one or more server computers. The gadgets in the gadget pool 282 can be made available, for free or with a fee, through the network 208 to the public or authorized users (which can include, e.g., 312, 314, and 316).

The creators of some of the gadgets in the gadget marketplace can charge fees for the use of their gadgets. The gadget pool 282 can include an authentication mechanism 290 and a payment mechanism 292 to enable secure trading of the gadgets. The authentication mechanism 290 can, for example, allow a new user to open an account with a user name, a password, and optionally, other identity certification information, e.g., credit card information. A user can access the pool 282 using his or her account information. The payment mechanism 292 can allow online payment using, for example, a credit card, a debit card, a bank card, a gift card, or other payment methods. The fee can be charged based on, for example, the use of the gadget(s), e.g., a certain fee per ad campaign.

Some gadgets, for example, gadgets 284, 286, in the gadget pool 282 can interact with one another, and such gadgets can be grouped in one or more subgroups, for example, subgroups 294, 296. In the example of subgroup 294, at least a portion of information contained in or otherwise available to the gadget 284 is shared with the other gadget 286 so that when the information is updated in the gadget 284, the updated information is populated to the gadget 286, e.g., by use of an API 298a. Similarly, when information contained in the gadget 286 is shared by the gadget 284, updating the information contained in the gadget 286 will also cause the updated information to be transmitted to the gadget 284, e.g., by use of an API 298b. Other examples of the gadgets that interact with one another are also provided in FIGS. 3 and 4.

In some implementations, when a user accesses the gadget pool to purchase or download a gadget in a subgroup, the gadget pool automatically presents one or more related gadgets to the user. In some implementations, the fee for use of two or more related gadgets in a subgroup can be calculated differently from the use of individual gadgets in order to encourage the use of the related gadgets.

In addition to the gadgets that are used for measurement of the effectiveness of an ad or ad campaign, the gadget pool can also include a variety of gadgets for other uses. For example, in connection with the ad or ad campaign, the gadget pool can include a first gadget that is build based on an econometric model and other types of modeling algorithms that use basic company and market data to provide recommendations on the mixture use of various types of media for the marketing of a product. For example, the gadget can, prior to or during the campaign, provide a recommendation on what percentage of the advertising budget should be spent in various media, e.g., online, TV, radio, and/or print media.

A creator of the media gadget can take basic company data along with inputs such as product lifecycle and product category, and produce a cross-media mix allocation recommendation. The creator can also create a second, more sophisticated gadget that takes current campaign data from various resources and use the data to enhance the results of the cross-media mix recommendations both within one particular medium or across media. The accuracy of the predictions of the modeling gadgets can be measured using the campaign effectiveness dashboard containing effectiveness measuring gadgets, as described above.

Various marketing methods can be applied in selling the gadgets in the gadget pool 282. In the example of the media mix gadgets discussed above, to promote marketing of the second gadget, the creator of the first and second gadgets can offer the first gadget for free to attract customers. Customers can freely try the functions of the first gadget and determine whether they wish to purchase the second gadget, which has enhanced features.

Examples of Gadgets

As described above, the dashboard 136 may show various gadgets 135 that analyze and present information useful for evaluating performances of advertisements and ad campaigns. The gadgets 135 may be written by the users of the dashboard 136 or obtained from the gadget marketplace. The gadgets 135 can include client-side code that resides on a client (e.g., computer of an advertiser 102) and can access private data of the client and sharable data hosted at the advertisement management system 104. The gadgets 135 can also include server-side code that resides on a server (e.g., advertisement management system 104) that utilizes the data processing power of the system 104 and processes a vast amount of data hosted on the system 104.

The following describes an example gadget that collects information related to the timing of both a content presentation on a web page and a web page access by a user, and uses the collected information to determine if the user accessed the web page while the content was presented on the web page. By knowing whether certain users who accessed certain web pages have viewed a particular ad or otherwise acted upon the ad, it may be possible to analyze user behavior and determine the effectiveness of the ad, e.g., by comparing on-line behaviors of users who have viewed the ad with on-line behaviors of users who have not viewed the ad.

In some implementations, the gadget may merge records from browsing logs provided by page link analysis tools and content logs provided by a content server. The browsing logs may provide information about the browsing histories of end users, such as when and what web pages were accessed by the end users. The content server can be, e.g., an ad server, and the content log can provide information about when and where ads were served. The timing of events recorded in the browsing logs and the content log may not match exactly. The gadget may merge the two logs by determining time intervals, each time interval being between a time point related to when a web page is accessed on a device and another time point related to when a content item is displayed on the accessed web page, and comparing the time intervals with one or more threshold values.

Figure 8:
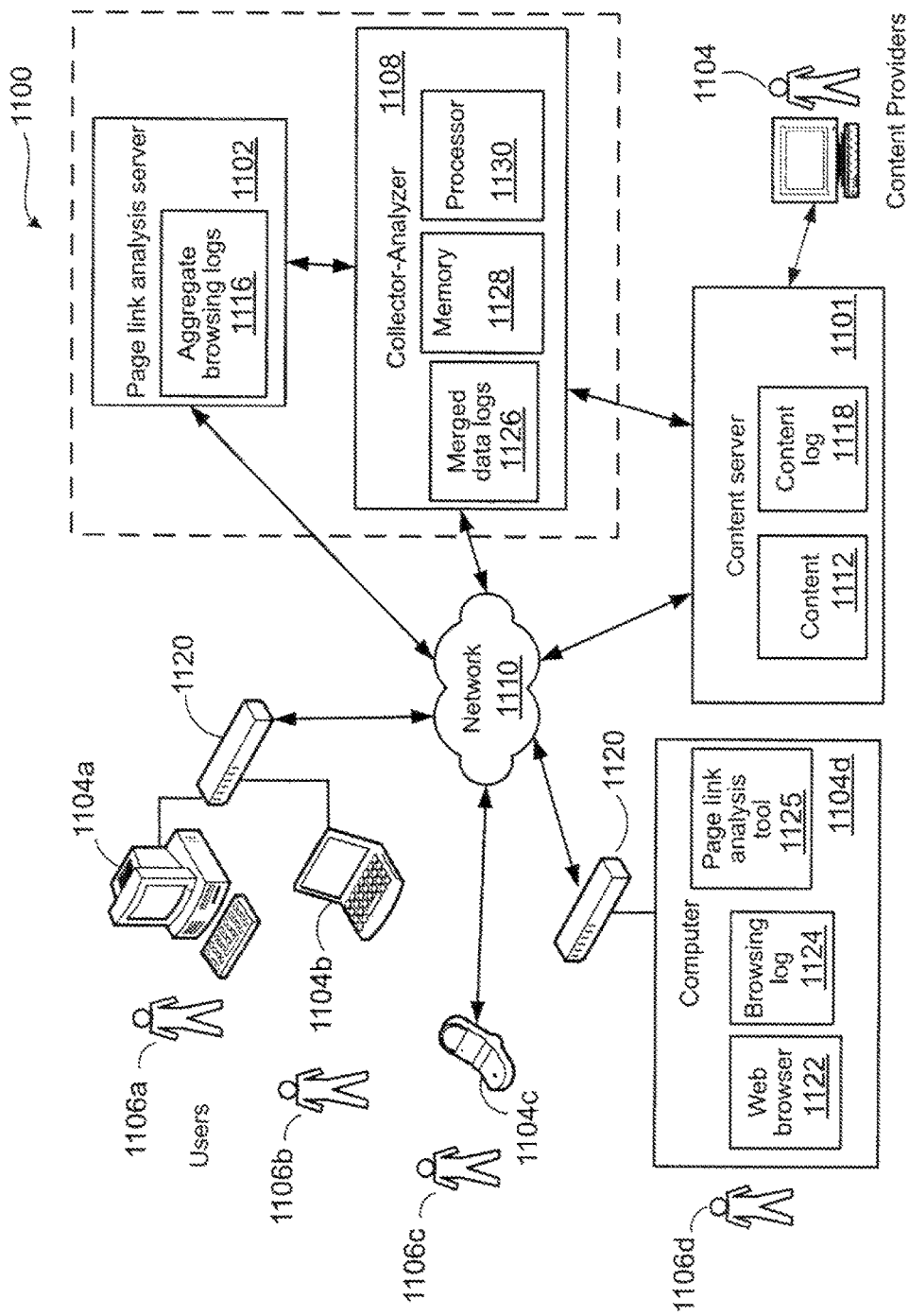
FIG. 8 is a schematic diagram of an example information system.

Referring to FIG. 8, an example information system 1100 is shown for obtaining and analyzing information related to web pages accessed by users and content displayed on the accessed web pages.

Information is exchanged through a network 1110 between a content server 1101, computers (e.g., computer 1104a, laptop 1104b, cell phone 1104c, computer 1104d) that are each associated with a user (e.g., user 1106a, 1106b, 1106c, 1106d), a page link analysis server 1102, web site publishers that host web sites on web servers (not shown), and a collector-analyzer 1108. The collector-analyzer 1108 can include two components: a collector that collects data and an analyzer that analyzes data.

In some examples, a user (e.g., user 1106a, user 1106b) accesses web pages using a web browser 1122, such as Firefox®, Microsoft® Internet Explorer (MSIE), Safari®, or Chrome, that is installed on the computer (e.g., computer 1104a, computer 1104b). The computer can use an application program, such as a page link analysis tool 1125, to evaluate the accessed web pages while preserving privacy of a user. Information about the internet browsing session can be gathered, for example, the time and date the user 106d accesses a web page, the web page accessed (e.g., the URL), and a unique identification (ID) number. In general, the unique ID is not associated with personally-identifiable information of user 1106d. The browsing information can be recorded and stored in a log 1124, which can be stored in the memory of the computer 1104d.

For example, while browsing web pages, the user 1106d can use a web toolbar that has a page link analysis feature enabled. As the user 1106d visits various web pages, the page link analysis tool 1125 stores information in a browsing log 1124 that can include information such as universal resource locators (URLs) of the web pages, time stamps indicating when the user 1106d visited the web pages, an Internet Protocol (IP) address associated with the user 1106d, and a unique identification (ID) number that can be part of a cookie. As described above, the unique ID is generally not associated with personally-identifiable information of user 1106d. The information, in part or as a whole, can be sent to a page link analysis server 1102, and combined with browsing logs 1124 from other users into aggregate browsing logs 1116. The information sent from individual computers can be filtered or anonymized to preserve the privacy of individual users.

The information stored in the browsing log 1124 associated with a user (e.g., user 1106c, user 1106d) can be sent to the page link analysis server 1102, to the collector-analyzer 1108, or both. The page link analysis server 1102 determines the page link analysis of the web pages associated with the URLs and sends the page link analysis results to the page link analysis tool 1125 associated with the user (e.g., user 1106c). The page link analysis tool 1125 then displays the page link analysis results. The browsing log 1124 can be combined with other browsing logs 1124 to form aggregate browsing logs 1116, which can be stored on the page link analysis server 1102, on the collector-analyzer 1108 (e.g., in a memory 1128), or both. The aggregate browsing logs 1116 preferably cannot be traced to the personal identities of individual users. This ensures privacy of the users 1106 a-d.

The content server 1101 stores content 1112 (e.g., an advertisement) from content providers 1114. The content server 1101 can provide the stored content 1112 to a web site publisher. A web page that includes the content 1112 can be delivered from a web site publisher to users (e.g., users 1106a-d) through the network 1110. When the content 1112 is shown on a web page, the time and the location (e.g., the URL) of the showing can be recorded in addition to which IP addresses accessed the web page while the content was shown. The recorded information can be stored, for example, in a content log 1118 on the content server 1101, or in a log on the web site server, or in both logs.

Neither the content log 1118 nor the browsing log 1124 by itself contains all the information needed to identify which users were exposed to the content 1112. This identification is important and can be used, for example, to help determine how on-line behaviors of users are affected by content (e.g., ads) that is presented. The behavioral determinations (e.g., how likely users who were presented with a content are to visit other web pages or to participate in financial or searching transactions) then can be used to adjust the content 1112 that is presented to other users who have similar demographics or determined behaviors. In some examples, the impact of an ad campaign can be assessed so that advertising money may be spent more effectively and so that users may receive more relevant ads.

The collector-analyzer 1108 of the information system 1100 merges the information in the content log 1118 and the aggregate browsing logs 1116 and creates merged data logs 1126. The merged data logs 1126, which can be created by performing operations on a processor 1130 and stored in a memory 1128 of the collector-analyzer 1108, then can be used to determine which users have accessed a web site while the content 1112 (e.g., an ad) was displayed on the web site.

Merging Data Logs

Figure 9:
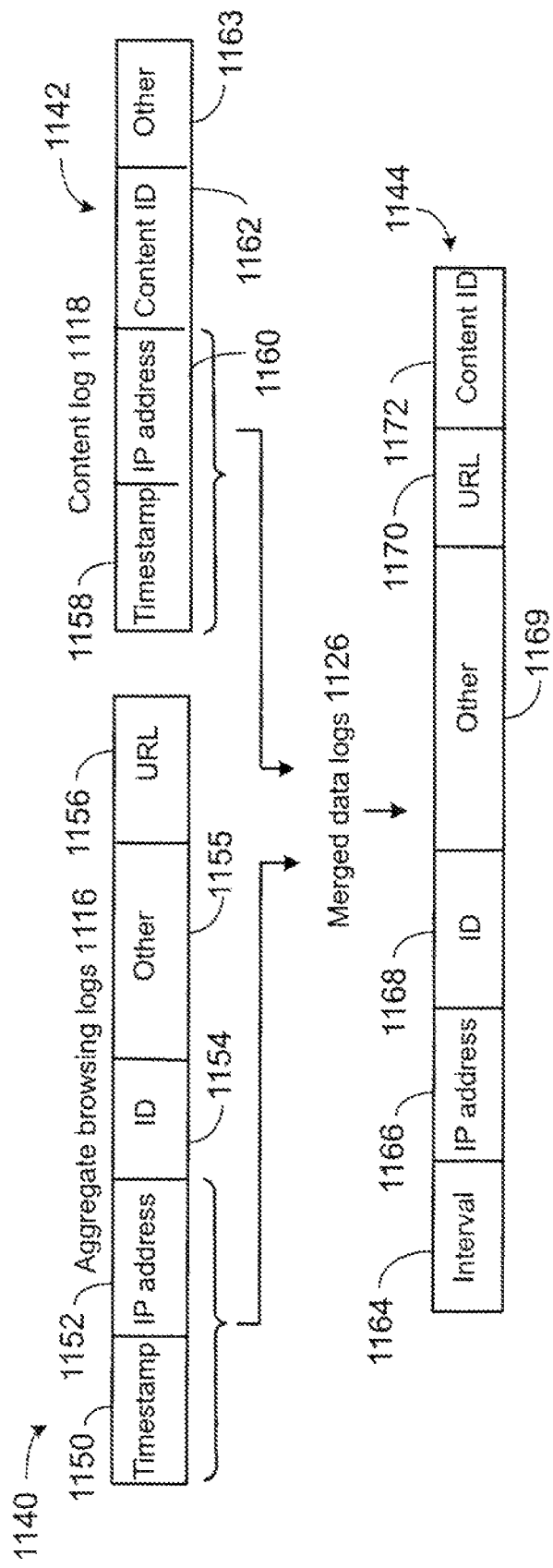
FIG. 9 is a schematic diagram of example data logs.

Referring to FIG. 9, as an example, the aggregate browsing logs 1116 include browse records 1140. Each browse record 1140 can include, e.g., a browsing timestamp 1150, a browsing IP address 1152, a user ID 1154, a URL 1156, as well as other information 1155 (e.g., a language used in the browser, a country in which the user is located, a version of software being used by the user, a screen size of a computer 1104 used for accessing websites). Multiple browsing timestamps 1150 and browsing IP addresses 1152 can be listed in the browse record 1140. The user ID 1154 can be, e.g., an identifier of the page link analysis tool 1125. The content log 1118 can include content records 1142. Each content record 1142 can include, e.g., a content timestamp 1158, a content IP address 1160, a content identifier 1162, as well as other information 1163.

The browse record 1140 and the content record 1142 can be merged based on matching the browsing IP address 1152 and the content IP address 1160 and the browsing timestamp 1150 and the content timestamp 1158 (within a predetermined window). A major complication is that the browsing timestamp 1150 may correspond to a different type of event than the type of event that is associated with the content timestamp 1158. It is possible that the clocks are misaligned, it is also possible that both clocks are accurate but they record different events in serving ads.

The merged records 1144 correspond to the merged data logs 1126 and can be stored at the collector-analyzer 1108. Each merged record 1144 includes an interval 1164, an IP address 1166, an ID 1168, a URL 1170, a content ID 1172, and can include other information 1169. The interval 1164 is equal to a difference between the browsing timestamp 1150 and the content timestamp 1158. The IP address 1166 is the same as the browse IP address 1152, which is the same as the content IP address 1162. The ID 1168 is the same as the user ID 1154, the URL 1170 is the same as the browse URL 1156, and the content ID 1172 is the same as the content ID 1162.

In order to determine when a user was presented with the content 1112, a situation that will be referred to as a "true" match, the timings of the events are analyzed carefully. The conditions that make a "true" match more likely than a "false" match (i.e., a user was not presented with the content 1112) can be estimated by statistically analyzing the merged data logs 1126. A merged record 1144 indicates a "true" match when the IP addresses of the records 1140 and 1142 are the same and the interval 1164 is smaller than a predetermined threshold.

By analyzing the information in the merged data logs 1126, the collector-analyzer 1108 can provide information about the web browsing history of a user (e.g., the 1106d) before and after receiving the content 1112. Because the aggregate browsing logs 1116 include data collected from many users, the collector-analyzer 1108 can effectively compare users who have been presented with the content 1112 and users who have not been presented with the content 1112 and examine the differences in on-line behaviors of the two groups of users to infer the effectiveness of the content 1112.

Data Analysis and Match Classification

Figure 10:
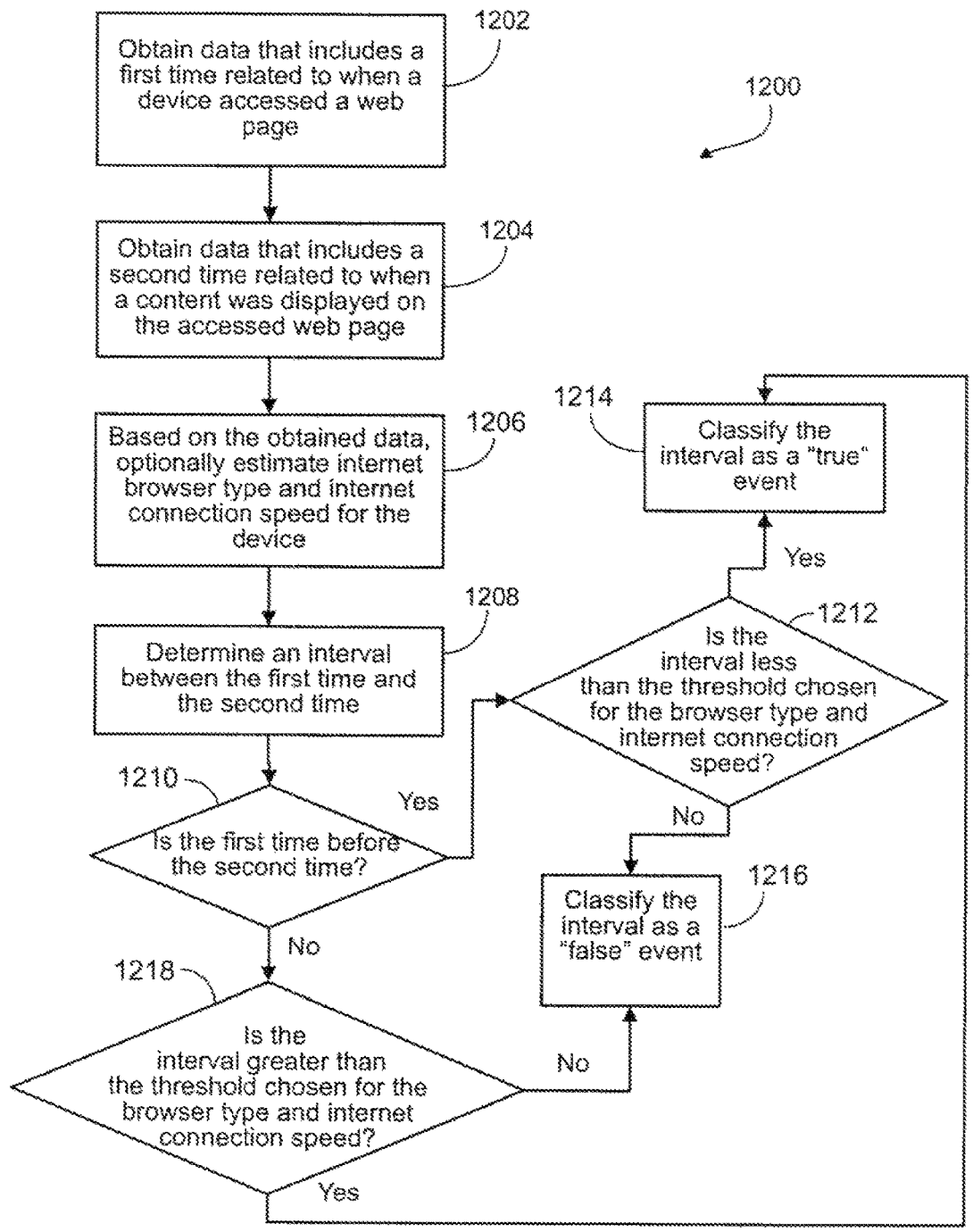
FIGS. 10 and 11 are flow diagrams of example processes for determining if a match between two events should be classified as a "true" or a "false" match.

FIG. 10 shows a process 1200 that represents a sequence of operations performed by the collector-analyzer 1108 in analyzing the data in the merged data logs 1126. For example, the operations can be executed by the processor 1130 of the collector-analyzer 1108. In some embodiments, the operations can be executed by multiple processors present in the collector-analyzer 1108. Operations can include obtaining 1202 data (e.g., log 1124) that includes a first time (e.g., the browsing timestamp 1150) related to when a device (e.g., computer 1104a) accessed a web page; obtaining 1204 data (e.g., log 1116, log 1118) that includes a second time (e.g., the content timestamp 1158) related to when content was displayed on the accessed web page. The obtained data can be used to optionally estimate 1206 the browser type (e.g., Firefox®, Microsoft® Internet Explorer, Safari®, Chrome) that accesses the web page, the internet connection speed for the device, or both. In some examples, the connection speed can be fast (e.g., broadband technologies such as DSL, cable modems, VDSL, or optical fiber) or slow (e.g., a dial-up connection). In some examples, the browser type or the internet connection speed or both can be unknown.

An interval (e.g., the interval 1164) can be determined 1208 between the first time (e.g., the browsing timestamp 1150) and the second time (e.g., the content timestamp 1158). It can be determined 1210 whether the first time occurred before the second time. In some implementations, if the first time is determined to have occurred before the second time, a decision is made 1212 whether or not the interval is less than a threshold chosen for the browser type and the internet connection speed. If the interval is less than the threshold, the match is classified 1214 as a "true" match; if not, the match is classified 1216 as a "false" match. Likewise, if the first time is determined to have occurred after the second time, a decision is made 1218 whether or not the interval is greater than a threshold chosen for the browser type and the internet connection speed. If the interval is greater than the threshold, the match is classified 1214 as a "true"; if not, the match is classified 1216 as a "false."

In some implementations, there can be two thresholds that define three regions: true, uncertain and false. For example, if the interval is less than a first threshold, the event is classified as true. If the interval is larger than a second threshold, the event is classified as false. If the interval is between the two thresholds, the event is classified as unknown. The two thresholds can be used to control both the probability of wrongly declaring true and wrongly declaring false.

In some embodiments, the results of the process 1200 can be accomplished by performing the described steps in a different order. In some embodiments, detection of true, false, or uncertain matches can be performed by adding steps to the data collecting and analyzing.

EXAMPLES

The following is an example that illustrates various steps that can occur in the system 1100 when web pages and content 1112 are delivered to users. For example, at 10:02 pm on Dec. 8, 2008, a service provider can deliver a web page (e.g., http://www.nytimes.com) to a computer (e.g., cell phone 104c) associated with a user 1106c. Content 1112 (e.g., an advertisement by Neiman Marcus) can also be provided on the web page when the user accesses the web page. A record can be created in a log (e.g., browsing log 1124, aggregate browsing log 1116) that can include, for example, the time and date, the URL of the web page, a unique ID associated with the user 1106c, and an IP address associated with the cell phone 1104c, which can use a mobile IP, 3G, or other communication protocol. A record can also be created in a log (e.g., content log 1118) that can include, for example, an identifier of the content 1112 shown, the time and date the content was shown, the URL of the web page that displayed the content, and which IP addresses may have viewed the content. The browsing log 1124 typically does not contain information about the content 1112 shown on the web page.

Alternatively or in addition, a service provider can deliver (e.g., through a router 1120) a web page to one or more computers (e.g., computer 1104a and laptop 1104b) associated, respectively, with users 1106a and 1106b. A connection between the router 1120 and the computers can be wireless or through a hardware connection. In some examples, a computer 1104a and a laptop 1104b at a home or an office can share an IP address and use the same router 1120. Two users 1106a and 1106b can each access different websites at his respective computer within a short period of time (e.g., by one second apart) while two different contents 1112 are presented on the web sites. In this example, the shared IP address will be recorded twice in the content log (e.g., content log 1118) each being associated with respective content 1112. Without additional information, any behavioral determinations (e.g., how likely users are to visit other web pages or to participate in financial or searching transactions) may not be correlated with the appropriate content 1112. Therefore, it is useful to combine the browsing log 1124 and the content log 1118 to provide information on which of the users 1106a and 1106b accessed which website and viewed which content 1112.

In another example, the computer 1104a and the laptop 1104b, which share an IP address and use the same router 1120, can be used, respectively, by users 1106a and 1106b. If a browsing log 1124 is associated with the user 1106a and a separate browsing log 1124 is associated with the user 1106b, differences in web behaviors can be recorded for each user. For example, if the user 1106b accesses the web site on laptop 1104b while the content 1112 is presented, but user 1106a does not access a web site that displays the same content 1112, information can be recorded in logs (e.g., browsing log 1124, aggregate browsing log 1116, content log 1118) that specify these differences.

The collector-analyzer 1108 can determine which user at the shared IP address accessed the web site while the content 1112 was presented. The collector-analyzer 1108 makes determinations for anonymized users. However, IP addresses that are known to provide a large number of users with web access (e.g., universities, corporations) can be excluded from analysis by the collector-analyzer 1108. In some examples, historical data can be used to monitor the level of activity of IP addresses, and, if there is an inconsistency with previously monitored usage rates, the IP addresses can be excluded from analysis by the collector-analyzer 1108.

The collector-analyzer 1108 can obtain a first data (e.g., browsing log 1124, aggregate browsing log 1116), which contains information related to when a user (e.g., user 1106d) accessed a web page, and a second data (e.g., content log 1118), which contains information related to when a content (e.g., content 1112) was displayed on the accessed web page.

The first data can be merged with the second data to form a merged data log (e.g., merged data logs 1126), which can be stored in a memory 1128 of the collector-analyzer 1108 and analyzed by executing instructions in a processor 1130 of the collector-analyzer. Because the recorded events can be of different natures (e.g., when the content 1112 was presented versus when the user 1106d accessed the web page), in order to determine when a user was presented with the content 1112, an occurrence that is also referred to as a "true" match, the timing of the events should be analyzed carefully.

The system 1100 can generate reports having information about how users' behaviors changed after presentation of the content 1112. The reports can be provided to a content provider 1114.

Classification of Matches and Derivation of a Threshold

Figure 11:
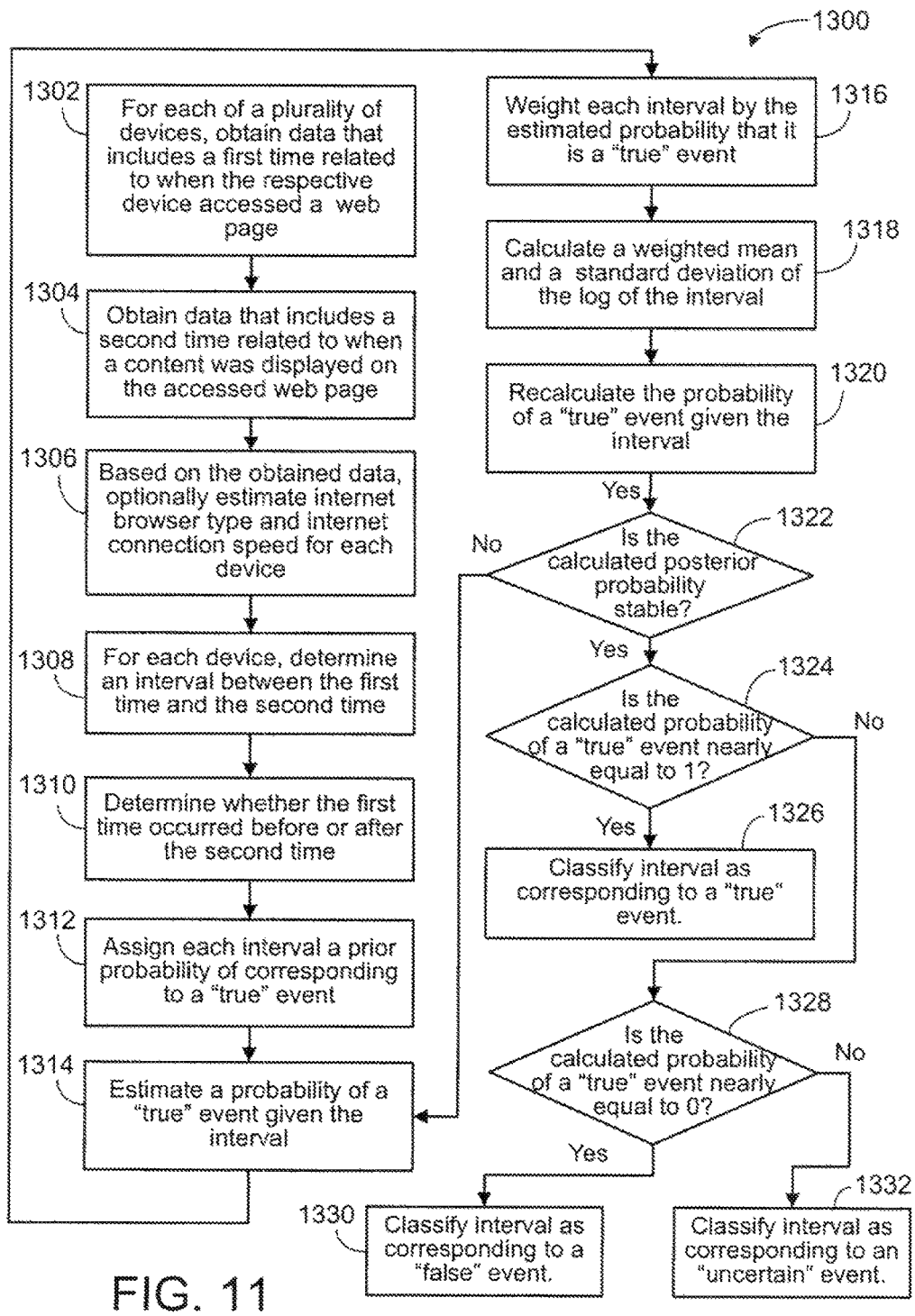

Referring to FIG. 11, a process 1300 describes a sequence of operations for classifying each of a plurality of intervals that correspond to the time between two events as "true" (i.e., the two events are "matched"), "false" (i.e., the two events are "unmatched"), or "uncertain" (i.e., the two events are neither "matched" nor "unmatched" with confidence). The operations, performed by the collector-analyzer 1108, are executed typically by the processor 1132. In some embodiments, the operations can be executed by multiple processors present in the collector-analyzer 1108. For each of a plurality of devices (e.g., computers, cell phones) data can be obtained 1302 that includes a first time (e.g., the browsing timestamp 1150) related to when the respective device accessed a web page. Data can also be obtained 1304 that includes a second time (e.g., the content timestamp 1158) related to when content was displayed on the accessed web page. Based on the obtained data, an internet connection speed and a browser type can optionally be estimated 1306 for each device.

An interval can be determined 1308 for each device between the first time (e.g., the browsing timestamp 1150) and the second time (e.g., the content timestamp 1158). Each interval can be assigned 1312 a prior probability of corresponding to a "true" match (e.g., a user accessed the web page while a content was displayed on the web page). If the interval is larger than a predetermined value (e.g., about five minutes, about seven minutes, about 10 minutes, fractional values between five and 10 minutes), the interval can be excluded from analysis because it is unlikely to correspond to a "true" match. The prior probability is a marginal or unconditioned probability of a match and can be interpreted as a description of what is known about a variable in the absence of new data. The prior probability differs from a posterior probability, which is a conditional probability of the variable that considers the implications of new data. The posterior probability is computed from the prior probability and Bayes' theorem:

$$P(\text{true} \mid D) = \frac{P(\text{true}) \cdot \text{non\_uniform\_dist}(D \mid \mu, \sigma)}{P(\text{true}) \cdot \text{non\_uniform\_dist}(D \mid \mu, \sigma) + P(\text{false})/\max\_D}, \quad (1)$$

in which D represents an interval between the first and second times, P(true) represents the prior probability of a "true" match, non_uniform_dist represents a non-uniform distribution that has a mean μ and a standard deviation σ, P(false) represents the prior probability of a "false" match, and max_D represents the maximum distance between the first and second times. The mean μ and the standard deviation σ can be unknown and estimated iteratively (e.g., using an expectation-maximization algorithm, gradient descent method, Gauss-Newton method).

A "true" match can be considered as a sample from a distribution having certain parameters (e.g., a mean μ, a standard deviation σ). The parameters of this distribution can be estimated iteratively for a given interval. Referring again to the process 1300 in FIG. 11, a probability of a "true" match can be estimated 1314 for a given interval D. Each interval can be weighted 1316 by the estimated probability that it is a "true" match. A weighted mean and a standard deviation of the log of the interval can be calculated 1318. The probability of a "true" match can be recalculated 1320 for a given interval.

A decision is made 1322 whether or not the calculated posterior probability that the interval corresponds to a "true" match is stable, or not changing by a predetermined amount during successive iterations. If the calculated posterior probability is not stable (i.e., is changing more than a predetermined amount), steps 1314, 1316, 1318, and 1320 are repeated. If the calculated posterior probability is stable, it is decided 1324 if the calculated posterior probability of a "true" match is nearly equal to 1 (e.g., about 0.9-about 0.99999). If the calculated posterior probability of a "true" match nearly equals 1, the interval is classified 1326 as corresponding to a "true" match. If the calculated posterior probability of a "true" match does not nearly equal 1, it is decided 1328 if the calculated posterior probability of a "true" match is nearly equal to 0 (e.g., about 0.00001-about 0.001) the interval is classified 1330 as corresponding to a "false" match. If the calculated posterior probability of a "true" match does not nearly equal 0, the interval is classified 1332 as corresponding to an "uncertain" match.

In some embodiments, the results of process 300 can be accomplished by performing the described steps in a different order. In some embodiments, detection of true, false, or uncertain matches can be performed by adding steps to the data collecting and analyzing.

Figure 12:
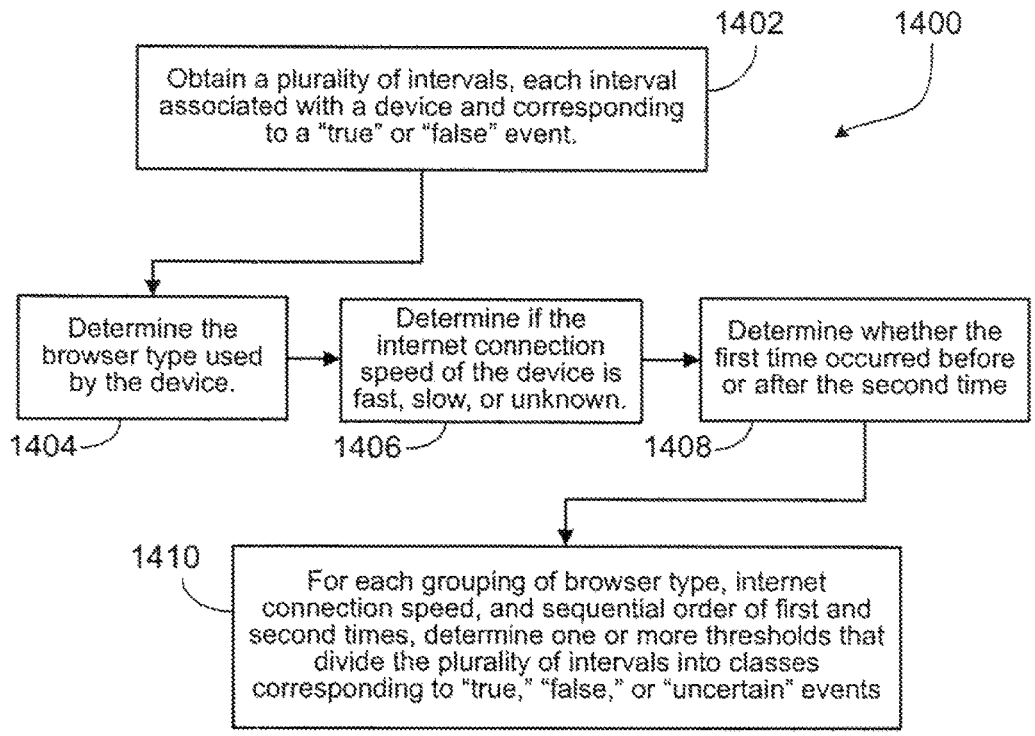
FIG. 12 is a flow diagram of an example process for determining a threshold between "true" matches and "false" matches.

Referring to FIG. 12, a process 1400 describes a sequence of operations for determining a threshold to help classify each of a plurality of intervals that correspond to the time between two events as "true," "false," or uncertain. The operations, performed by the collector-analyzer 1108, are executed typically by the processor 1132. In some embodiments, the operations can be executed by multiple processors present in the collector-analyzer 1108. A plurality of intervals can be obtained 1402, in which each interval is associated with a device (e.g., a computer, a cell phone) and corresponds to a "true" match, a "false" match, or an "uncertain" match. The obtained data can be used to determine 1404 the browser type (e.g., Firefox®, Microsoft® Internet Explorer, Safari®, Chrome, or unknown) used to access the web page. The obtained data can also be used to determine 1406 the internet connection speed (e.g., fast, slow, or unknown). The obtained data can also be used to determine 1408 whether the first time (e.g., the browsing timestamp 1150) occurred before or after the second time (e.g., the content timestamp 1158). In some examples, the determinations 1406 and 1408 can be made by analyzing information in log files (e.g., browsing log 1124, aggregate browsing log 1116, content log 1118). In some examples, the determinations 1406 and 1408 can be made previously (e.g., estimate 1306 and determination 1310, respectively) and need not be determined again.

For each grouping of browser type, internet connection speed, and sequential order of first and second times, one or more thresholds can be determined 1410 that divide the plurality of intervals into classes corresponding to "true," "false," or "uncertain" matches. In some examples, a lower threshold can be determined, such that if a sample interval has a value between zero and the lower threshold, the sample interval would be classified as corresponding to a "true" match. In some examples, an upper threshold can be determined in addition to the lower threshold, such that if a sample interval has a value between the lower threshold and the upper threshold, the sample interval would be classified as corresponding to an "uncertain" match. If the sample interval has a value above the upper threshold, the sample interval would be classified as corresponding to a "false" match. The lower and upper thresholds can be determined such that misclassification of a sample interval is controlled. In some examples, the upper and lower thresholds can have the same value, while, in other examples, the upper and lower thresholds can have different values.

In some embodiments, the results of process 1400 can be accomplished by performing the described steps in a different order. In some embodiments, detection of true, false, or uncertain matches can be performed by adding steps to the data collecting and analyzing. The thresholds determined in the process 1400 can be derived from historical data. New data (e.g., intervals 1164 from merged data logs 1126) can be compared to the determined thresholds to classify the new data as corresponding to a "true" match, a "false" match, or an "uncertain" match.

The distribution parameters (e.g., a mean μ, a standard deviation σ) as well as the determined thresholds can be updated periodically (e.g., hourly, daily, weekly, monthly, bimonthly, every six months, every year). In some examples, the parameters and thresholds can be determined again using a combination of the historical data used previously and additional historical data received since the last determination of thresholds. In some examples, the process 1300 and the process 1400 can be rerun in part or in total. In some examples, classifications of new data can be recorded and an on-line algorithm can be used to adjust the distribution parameters and the determined thresholds at predetermined intervals (e.g., seconds, hours, days, weeks, months).

Figure 13:
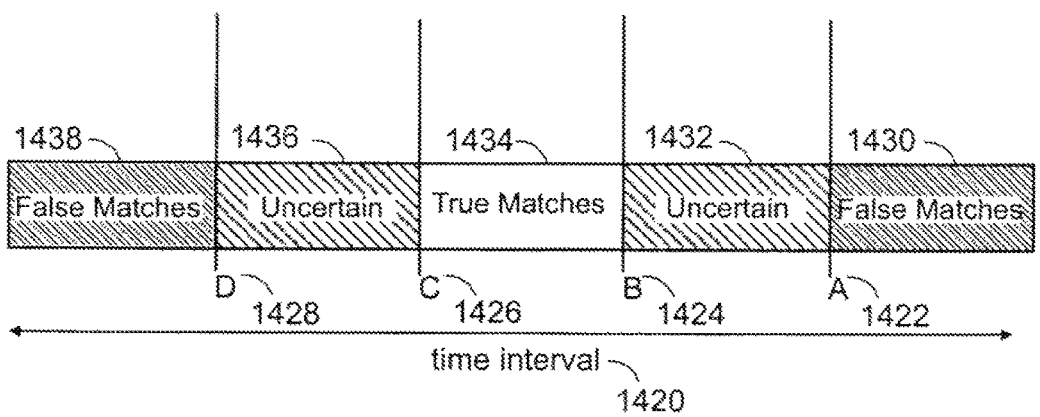
FIG. 13 is a diagram of showing example thresholds.

Referring to FIG. 13, an delta parameter (or time interval) can be calculated by subtracting the ad time from the web browsing time. The delta can be any value (positive, negative or zero. For each browser type, there are four thresholds (e.g., from most positive to most negative: threshold A 1422, threshold B 1424, threshold C 1426, and threshold D 1428). When delta is compared to these four thresholds, there are five possible cases:

(1) If delta is greater than or equal to A, then we know it is definitely not a match (delta falls within the "false matches" region 1430 in FIG. 13);

(2) If delta is less than A but greater than or equal to B, then it is an uncertain match (delta falls within the "uncertain" region 1432);

(3) If delta is less than B but greater than or equal to C, then it is a certain match (delta falls within the "true matches" region 1434);

(4) If delta is less than C but greater than or equal to D then it is an uncertain match (delta falls within the "uncertain" region 1436); and (5) If delta is less than D then it is definitely not a match (delta falls within the "false matches" region 1438).

In some examples, the potential "true" matches can be for Firefox® users who have fast internet connections and in which the browsing timestamp 1150 is after the content timestamp 1158. If the match is determined to be "false" or not a match, the corresponding interval D between the two timestamps has been classified as coming from a uniform distribution in which the probability for each sample is equal to 1/(maximum_interval−minimum_interval). For example, if intervals between ten minutes before or after an event were considered, the corresponding uniform distribution would be confined to (0, 600] seconds, and D would have a constant density with height 1/600 on (0,600] seconds for a "false" match. If the match were true, D has been determined to have a non-uniform distribution having a peak at zero and a long right tail. Both gamma and lognormal distributions have these properties and have no upper bound. In practice, these distributions give little probability far out in the tail so that they may be considered to be effectively bounded.

By using the system 1100, it has been shown that the question of whether or not a user (e.g., user 1106*b*) was accessing a web page while the content 1112 was displayed on the web page is equivalent to answering whether a given sample of an interval D is more likely to be a sample from a uniform distribution (which corresponds to a "false" match) or a non-uniform distribution (which corresponds to a "true" match), or if it is uncertain whether the interval D is a sample from a uniform or a non-uniform distribution.

As illustrated in equation 1, the EM algorithm has a Bayesian interpretation. Each single observation, interval D, has a prior probability, or P(match), of being a "true" match. In the end, a large range (e.g., 0.1-0.9) of prior probabilities was tried, and the choice of prior moved the determined threshold by no more than 0.1 seconds.) If the interval corresponds to a "true" match, then D has a non-uniform (e.g., lognormal, gamma) density; otherwise, the interval D has a uniform density.

If the parameters (e.g., the mean and standard deviation) of the non-uniform were known, then after observing D, the posterior probability of a "true" match is computed using Bayes theorem as given in equation 1. As the parameters are unknown, they can be estimated iteratively. Given the current estimates of P(match|D), each observation is weighted by the probability that it is a "true" match and a weighted mean and standard deviation of the log distances log(D) are computed. These would be the maximum likelihood estimates of ($\mu$, $\sigma$) if P(match|D) were correct. Next, if needed, the collector-analyzer 1108 can recalculate P(match|D) and re-estimate the lognormal parameters, stopping when the posterior probabilities are no longer changing by an amount to considerably alter the estimation.

After the algorithm has converged, each observation or interval D has its own P(match|D). If the probability is nearly one, then it is reasonable to assume that the user has accessed a web page while the content 1112 was displayed on the web page. If the probability is nearly zero, then it is reasonable to assume that it is a "false" match and that the user has not accessed a web page while the content 1112 was displayed on the web page. Otherwise, the true/false classification of the match is uncertain, and it cannot be safely assumed whether or not the user accessed a web page while the content 1112 was displayed on the web page.

Example Data Analysis

The procedure described above was applied separately to various combinations of Firefox® and MSIE browser types crossed with fast, slow, and unknown speeds, treating positive and negative intervals separately, and to data representing unknown browser type ignoring speed.

Figure 14:
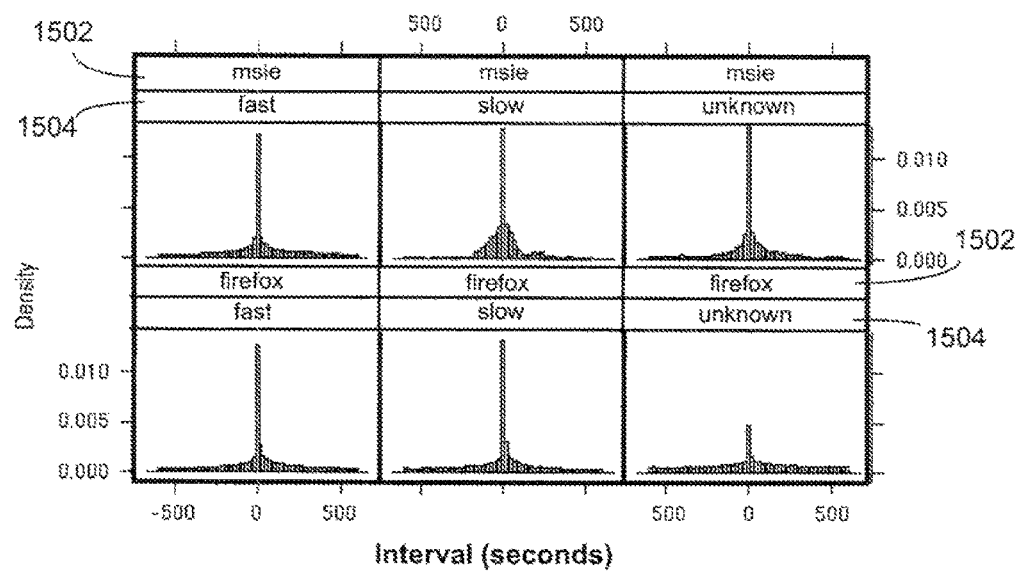

FIG. 14 displays example histograms of intervals calculated by the collector-analyzer 108 for merged data logs 1126 formed by combining sample content logs 1118 with aggregate browsing logs 1116. IDs 1154 and 1168 were identified that correspond to users who possibly accessed a website within a ten minute interval of the timestamp 1158, which is when the content 1112 was displayed. While a ten minute window is too large to contain only "true" matches, having a long window helps to understand how long the window should be in order to contain mostly "true" matches.

In the example shown in FIG. 14, there were over 300,000 potential "true" matches for the merged data logs 1126. These potential matches can be subdivided into different groups based on the determined web browser type and internet connection speed. For example, membership in these groups can be expressed as a percentage of the total number of potential matches. Of the over 300,000 potential "true" matches, about 72% used Firefox®, about 28% used MSIE, and the web browser 1122 was unidentified for about 0.09%. About 5% of both the MSIE and Firefox® browser users were determined to have a slow connection. Only about 9% of the MSIE users had an unknown internet connection speed, while about 25% of the Firefox® users had an unknown internet connection speed. Histograms in FIG. 14 are grouped according to the determined browser type (e.g., browser type 1502) and the determined internet connection speed (e.g., internet connection speed 1504). Each histogram shows the positive and negative intervals between the timestamp 1158 of when the content 1112 was displayed and the timestamp 1150 of when the closest browsing event was recorded in the browsing log 1124. The abscissa of each histogram is in units of seconds.

The tails of the histograms in FIG. 14 are relatively flat and, except for users of MSIE over a slow connection, pass a test for uniformity. Also, the peaks of the windows, where we would expect most of the matches to lie, lie near zero and are much higher than the tails, suggesting that it should be possible to identify some instances of users who were presented with content with high confidence. Even at this scale, which shows only the coarsest features, it is clear that MSIE users with slow connections have larger intervals than other users. The histogram for the MSIE users with unknown connect speeds look like a mixture of the MSIE fast and slow histograms; the histogram for the Firefox® users with an unknown connect speed has a smaller peak.

Figure 15:
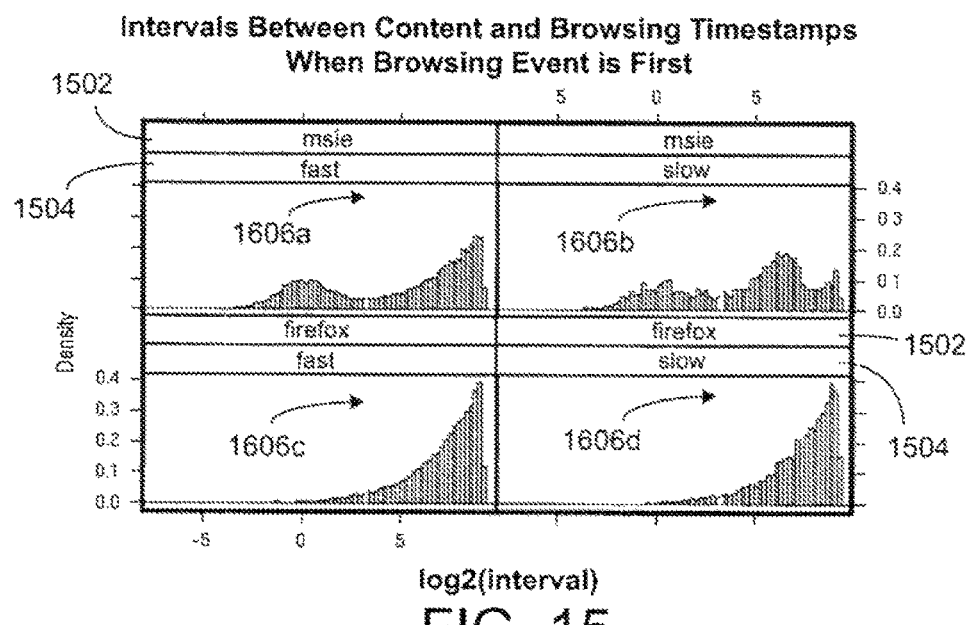

FIG. 15 focuses on the fast and slow, MSIE and Firefox® histograms of FIG. 14 (i.e., the two middle and two leftmost histograms) and plots the absolute intervals on a log scale. All intervals plotted in FIG. 15 have been determined to occur when the browsing timestamp 1150 is before the content timestamp 158. These plots, which use the same identifiers of browser type 1502 and internet connection speed 1504, focus on short intervals between the first time (e.g., the browsing timestamp 1150) and the second time (e.g., the content timestamp 1158), which are the ones most likely to correspond to "true" matches rather than "false" matches. On this scale, in this example, the tails increase exponentially for fast MSIE connections and all Firefox® connections, except in the very last bin.

A preliminary analysis suggested that browsing timestamps 1150 that occur within 10 seconds of a content timestamp 1158 should be considered "true" matches, and greater intervals should be considered coincidences. The vertical lines 1606a-d in the histograms shown in FIG. 15 are drawn at 10 seconds, or about 2.2 on the log scale in FIG. 15. This seems like a reasonable boundary between "true" and "false" matches for MSIE users on a fast connection, but not for Firefox® users. There is no peak in the intervals for Firefox® users, suggesting that none of the matches for Firefox® can safely be assumed to be true when the browsing timestamp 1150 precedes the content timestamp 1158. Only 2% of all Firefox® users would be affected by this cutoff in this study, but removing them from the "true" match group seems likely to reduce the false positive rate by 0.02.

Figure 16:
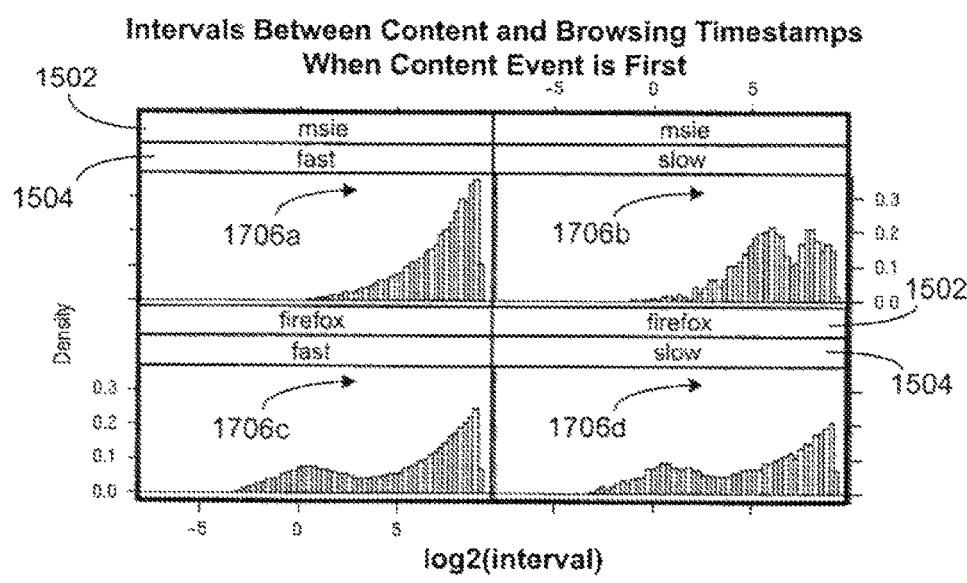

FIG. 16 presents the same types of histograms as shown in FIG. 15 except that all intervals plotted in FIG. 16 have been determined to occur when the browsing timestamp 1150 is after the content timestamp 1158. The opposite conclusion is reached when the content timestamp 1158 is first: the 10 second cutoff is reasonable for Firefox® users but seems to include mainly "false" matches for MSIE users; 3% of MSIE users in this example have positive intervals within the ten second window. Overall, 2.4% of the users in this study appear to be obvious false positives (or identified as a "true" match when they are in fact a "false" match) with a two-sided, ten-second window.

Referring to FIG. 17, portions of four histograms shown in FIG. 14 are presented: a zoomed view of the negative intervals (i.e., the browsing timestamp 1150 occurs before the content timestamp 1158) for MSIE and the positive intervals (i.e., the browsing timestamp 1150 occurs after the content timestamp 1158) for Firefox®. Vertical lines 1806a-d are drawn and labeled for the upper left figure at specific intervals: line 1806a is at 1 minute, line 1806b, at 2 minutes, line 1806c, at 4 minutes, and line 1806d, at 5 minutes. The respective vertical lines in the other histograms are placed at intervals that correspond to lines 1806a-d.

Standard algorithms (e.g., an expectation-maximization or "EM" algorithm) can be used to distinguish from which of two mixtures (i.e., a uniform distribution and a non-uniform distribution) an observation is drawn. For example, an EM algorithm works well on problems like this one in which one of the mixture components is known (i.e., the "false" match is drawn from a uniform distribution) and the two distributions have very dissimilar shapes.

Referring to FIG. 18, a table 1900 lists example combinations of browser type, internet connection speed, sequence of times (e.g., whether the first time occurred before or after the second time, the first time being the browsing timestamp 1150 and the second time being the content timestamp 1158), and a threshold that was determined or calculated for these conditions (e.g., as described in the process 1400). Example browser types in table 1900 include Firefox®, Microsoft® Internet Explorer, and unknown. Example internet connection speeds include fast, slow, and unknown.

The thresholds for most conditions were stable across choice of priors probabilities (e.g., between 0.1 and 0.9), and a lognormal fit is reasonable, except in the right tail where it has only a few samples. This may lead to a higher percentage of false negatives for larger distances, but because there is only a small number of samples in the tail of the lognormal, the error is not significant. Moreover, the region of uncertainty in the "nice" conditions (e.g., positive distances for Firefox® internet browsers, negative distances for MSIE internet browsers) is small, never more than 0.2 seconds, and so is not a significant source of error. This means that each potential "true" match has a posterior probability of being a "true" match that is either nearly one or nearly zero. The nice conditions and the thresholds separating true and false matches are shown in table 1900. The unknown browser type is included in the nice category because even though there is a relatively large uncertain region (mostly due to a lack of data in this region) the lognormal seems to fit the data likely to be exposures well.

As shown in table 1900, for a set of intervals from Firefox® internet browsers, it was determined that, regardless of internet connection speed, if the first time (e.g., the browsing timestamp 1150) occurs after the second time (e.g., the content timestamp 1158) (i.e., the first time is greater than the second time), no threshold was found to separate adequately the "true" matches from the "false" matches. Similarly, for a set of intervals from Microsoft® Internet Explorer internet browsers, it was determined that, regardless of internet connection speed, if the first time occurs before the second time (i.e., the first time is less than the second time), no threshold was found to separate adequately the "true" matches from the "false" matches. Additional analyses of more intervals in these categories may improve future threshold determination.

Also shown in table 1900, for a set of intervals in which the first time (e.g., the browsing timestamp 1150) occurs before the second time (e.g., the content timestamp 1158) (i.e., the first time is less than the second time), regardless of the type of internet browser used, an interval that is below a threshold of 6.3 seconds was classified as a "true" match. In addition, intervals between 6.3 seconds and 11.5 seconds were classified as "uncertain." Similarly, for a set of intervals in which the first time occurs after the second time (i.e., the first time is greater than the second time), regardless of the type of internet browser used, an interval that is below a threshold of 7.7 seconds was classified as a "true" match. In addition, intervals between 7.7 seconds and 9.9 seconds were classified as "uncertain." Additional analysis of more intervals from these categories may improve future categorization within the "uncertain" zone.

Figure 19:
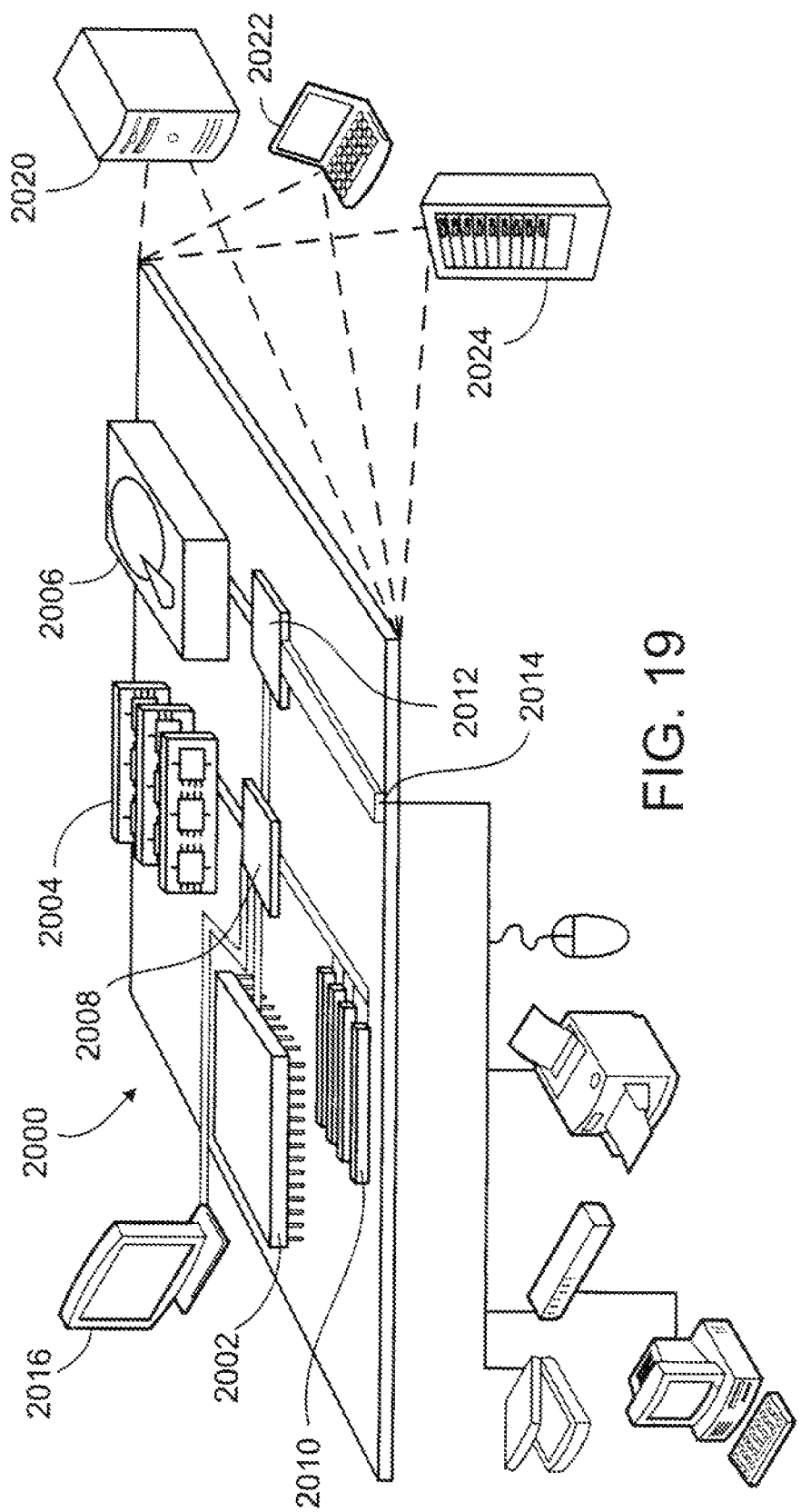
FIG. 19 is a diagram of an example computing device.

FIG. 19 is a schematic representation of a general computing system 2000 that can be used to implement the advertisement management system 104, search engine 112, collector-analyzer 1108, page link analysis server 1102, content server 1101, or their components. Computing device 2000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described or claimed in this document.

Referring to FIG. 19, the computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 1000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, memory on processor 2002, or a propagated signal.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Each of such devices (e.g., standard server, rack server system, personal computer, laptop computer) may contain one or more of computing device 2000, and an entire system may be made up of multiple computing devices 2000 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations and examples have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated. For example, while this specification contains many specific implementation details, these should not be construed as limitations on the scope of any invention or of what may be claimed, but rather as descriptions of features that may be specific to particular implementations of particular inventions. Certain features that are described in this specification in the context of separate examples can also be implemented in combination in a single example. Conversely, various features that are described in the context of a single example can also be implemented in multiple examples separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

In addition, the logic flows depicted in the figures do not require the particular order shown, or sequential order, to achieve desirable results. Other steps may be provided, or steps may be eliminated, from the described flows, and other components may be added to, or removed from, the described systems.

The techniques for matching timestamps described above can be used in joining of any types of two or more logs, in which the logs can be different than those described above. Accordingly, other implementations are within the scope of the following claims.

What is claimed is:

1. A method, comprising:
   identifying, from a first source, advertisement log data that includes a first timestamp specifying when an advertisement was provided to a user device having a given Internet Protocol (IP) address, wherein the advertisement log data does not include a user ID of a user of the user device;
   identifying, based on browsing log data from a second source, an online resource that was accessed by the user device having the given IP address and a second timestamp specifying when the online resource was accessed by the user device having the given IP address and the user ID of the user of the user device, wherein the browsing log data does not include information specifying the advertisement that was provided to the user device having the given IP address;
   determining, based on the second timestamp specifying when the online resource was accessed by the user device and the first timestamp specifying when the advertisement was provided to the user device having the given IP address, that a time difference between the first timestamp and the second timestamp is less than a specified time difference, wherein the second timestamp specifies a different time than the first timestamp;
   in response to determining that the time difference between the first timestamp and the second timestamp is less than the specified time difference, merging the advertisement log data and the browsing data to create a merged data log that matches a given user ID from the browsing log data with a presentation of the advertisement at the user device based on the given IP address being included in both of the advertisement log data specifying that the advertisement was provided to the user device and the browsing log data specifying that the online resource was provided to the user device; and
   outputting, over a communications network and to a client device, data that presents, at the client device, one or more content items based on the merged log data that includes both of the user ID and the information specifying that the advertisement was provided to the user device having the given user ID.

2. The method of claim 1, further comprising:
   determining, based on the advertisement log data or the browsing log data, a browser type used by the user device;
   determining, based on the advertisement log data or the browsing log data, an internet connection speed for the user device; and
   determining the specified time difference based at least in part on the browser type or the internet connection speed for the user device.

3. The method of claim 2, further comprising selecting the specified time difference based on probabilities that the advertisement was presented to the user associated when various time differences between timestamps exist.

4. The method of claim 1, wherein associating the given user ID from the browsing log data with the presentation of the advertisement comprises merging advertisement log data entries and browsing log entries based on the given IP address and the specified time difference to generate merged data logs.

5. The method of claim 4, further comprising:
   determining, based on browsing log entries having timestamps that are after the timestamp of the advertisement, that one or more user actions occurred following presentation of the advertisement at the user device; and
   determining, based on the one or more user actions, an effectiveness of the advertisement that was presented at the user device.

6. The method of claim 5, further comprising:
   adjusting an advertisement to be presented to the user based on the effectiveness of the advertisement;
   monitoring a level of activity from the given IP address over time;
   determining that there is an inconsistency in the monitored level of activity relative to previously monitored usage rates; and
   excluding the IP address from a subsequent analysis based on the determination that the inconsistency exists.

7. A system, comprising:
   a first data storage device storing advertisement log data from a first source;
   a second data storage device storing browsing log data from a second source; and
   one or more data processing apparatus that communicate with each of the first data storage device and the second data storage device and execute machine-readable instructions that cause the one or more data processing apparatus to perform operations comprising:
      identifying, from the first source, the advertisement log data that includes a first timestamp specifying when an advertisement was provided to a user device having a given Internet Protocol (IP) address, wherein the advertisement log data does not include a user ID of a user of the user device;

identifying, based on the browsing log data from a second source, an online resource that was accessed by the user device having the given IP address and a second timestamp specifying when the online resource was accessed by the user device having the given IP address and the user ID of the user of the user device, wherein the browsing log data does not include information specifying the advertisement that was provided to the user device having the given IP address;

determining, based on the second timestamp specifying when the online resource was accessed by the user device and the first timestamp specifying when the advertisement was provided to the user device having the given IP address, that a time difference between the first timestamp and the second timestamp is less than a specified time difference, wherein the second timestamp specifies a different time than the first timestamp;

in response to determining that the time difference between the first timestamp and the second timestamp is less than the specified time difference, merging the advertisement log data and the browsing data to create a merged data log that matches a given user ID from the browsing log data with a presentation of the advertisement at the user device based on the given IP address being included in both of the advertisement log data specifying that the advertisement was provided to the user device and the browsing log data specifying that the online resource was provided to the user device; and outputting, over a communications network and to a client device, data that presents, at the client device, one or more content items based on the merged log data that includes both of the user ID and the information specifying that the advertisement was provided to the user device having the given user ID.

8. The system of claim 7, wherein the machine-readable instructions cause the one or more data processing apparatus to perform operations further comprising:

determining, based on the advertisement log data or the browsing log data, a browser type used by the user device;

determining, based on the advertisement log data or the browsing log data, an internet connection speed for the user device; and determining the specified time difference based at least in part on the browser type or the internet connection speed for the user device.

9. The system of claim 8, further comprising selecting the specified time difference based on probabilities that the advertisement was presented to the user associated when various time differences between timestamps exist.

10. The system of claim 7, wherein associating the given user ID from the browsing log data with the presentation of the advertisement comprises merging advertisement log data entries and browsing log entries based on the given IP address and the specified time difference to generate merged data logs.

11. The system of claim 10, wherein the machine-readable instructions cause the one or more data processing apparatus to perform operations further comprising:

determining, based on browsing log entries having timestamps that are after the timestamp of the advertisement, that one or more user actions occurred following presentation of the advertisement at the user device; and determining, based on the one or more user actions, an effectiveness of the advertisement that was presented at the user device.

12. The system of claim 11, wherein the machine-readable instructions cause the one or more data processing apparatus to perform operations further comprising:

adjusting an advertisement to be presented to the user based on the effectiveness of the advertisement;

monitoring a level of activity from the given IP address over time;

determining that there is an inconsistency in the monitored level of activity relative to previously monitored usage rates; and excluding the IP address from a subsequent analysis based on the determination that the inconsistency exists.

13. A non-transitory computer storage medium encoded with machine-readable instructions that when executed by one or more data processing apparatus cause the one or more data processing apparatus to perform operations comprising:

identifying, from a first source, advertisement log data that includes a first timestamp specifying when an advertisement was provided to a user device having a given Internet Protocol (IP) address, wherein the advertisement log data does not include a user ID of a user of the user device;

identifying, based on browsing log data from a second source, an online resource that was accessed by the user device having the given IP address and a second timestamp specifying when the online resource was accessed by the user device having the given IP address and the user ID of the user of the user device, wherein the browsing log data does not include information specifying the advertisement that was provided to the user device having the given IP address;

determining, based on the second timestamp specifying when the online resource was accessed by the user device and the first timestamp specifying when the advertisement was provided to the user device having the given IP address, that a time difference between the first timestamp and the second timestamp is less than a specified time difference, wherein the second timestamp specifies a different time than the first timestamp;

in response to determining that the time difference between the first timestamp and the second timestamp is less than the specified time difference, merging the advertisement log data and the browsing data to create a merged data log that matches a given user ID from the browsing log data with a presentation of the advertisement at the user device based on the given IP address being included in both of the advertisement log data specifying that the advertisement was provided to the user device and the browsing log data specifying that the online resource was provided to the user device; and outputting, over a communications network and to a client device, data that presents, at the client device, one or more content items based on the merged log data that includes both of the user ID and the information specifying that the advertisement was provided to the user device having the given user ID.

14. The non-transitory computer storage medium of claim 13, further comprising:

determining, based on the advertisement log data or the browsing log data, a browser type used by the user device;

determining, based on the advertisement log data or the browsing log data, an internet connection speed for the user device; and determining the specified time difference based at least in part on the browser type or the internet connection speed for the user device.

15. The non-transitory computer storage medium of claim 14, wherein the machine-readable instructions cause the one or more data processing apparatus to perform operations further comprising selecting the specified time difference based on probabilities that the advertisement was presented to the user associated when various time differences between timestamps exist.

16. The non-transitory computer storage medium of claim 13, wherein associating the given user ID from the browsing log data with the presentation of the advertisement comprises merging advertisement log data entries and browsing log entries based on the given IP address and the specified time difference to generate merged data logs.

17. The non-transitory computer storage medium of claim 16, wherein the machine-readable instructions cause the one or more data processing apparatus to perform operations further comprising:

determining, based on browsing log entries having timestamps that are after the timestamp of the advertisement, that one or more user actions occurred following presentation of the advertisement at the user device; and determining, based on the one or more user actions, an effectiveness of the advertisement that was presented at the user device.

18. The non-transitory computer storage medium of claim 17, wherein the machine-readable instructions cause the one or more data processing apparatus to perform operations further comprising:

adjusting an advertisement to be presented to the user based on the effectiveness of the advertisement;

monitoring a level of activity from the given IP address over time;

determining that there is an inconsistency in the monitored level of activity relative to previously monitored usage rates; and excluding the IP address from a subsequent analysis based on the determination that the inconsistency exists.

* * * * *

UNITED STATES PATENT AND TRADEMARK OFFICE
CERTIFICATE OF CORRECTION

PATENT NO. : 10,108,979 B2  
APPLICATION NO. : 14/701070  
DATED : October 23, 2018  
INVENTOR(S) : Shulman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this  
Thirteenth Day of December, 2022

Katherine Kelly Vidal  
*Director of the United States Patent and Trademark Office*